US011854051B2

(12) United States Patent
Smith et al.

(10) Patent No.: US 11,854,051 B2
(45) **Date of Patent: *Dec. 26, 2023**

(54) SYSTEMS AND METHODS FOR GENERATING EFFICIENT ITERATIVE RECOMMENDATION STRUCTURES

(71) Applicant: STATE FARM MUTUAL AUTOMOBILE INSURANCE COMPANY, Bloomington, IL (US)

(72) Inventors: Taylor Griffin Smith, Addison, TX (US); Jason Matthew White, Dallas, TX (US); Joseph David Albright, Norcross, GA (US); Tim G. Sanidas, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/828,846

(22) Filed: May 31, 2022

(65) Prior Publication Data

US 2022/0292552 A1 Sep. 15, 2022

Related U.S. Application Data

(63) Continuation of application No. 15/991,544, filed on May 29, 2018, now Pat. No. 11,361,349.

(51) Int. Cl.

*G06Q 30/0282* (2023.01)
*G06Q 50/00* (2012.01)

(Continued)

(52) U.S. Cl.

CPC ..... *G06Q 30/0282* (2013.01); *G06Q 30/0201* (2013.01); *G06Q 30/0205* (2013.01); *G06Q 50/01* (2013.01)

(58) Field of Classification Search

CPC combination set(s) only.
See application file for complete search history.

(56) References Cited

U.S. PATENT DOCUMENTS

| | | | |
|---|---|---|---|
| 7,492,714 B1 | 2/2009 | Liao et al. | |
| 2009/0083258 A1 | 3/2009 | Koren et al. | |

(Continued)

FOREIGN PATENT DOCUMENTS

| | | | |
|---|---|---|---|
| CA | 2829356 A1 | 4/2014 | |
| KR | 101373520 B1 * | 9/2013 | ............. A63F 13/30 |

(Continued)

OTHER PUBLICATIONS

Yoon SH, Kim JS, Ha J, Kim SW, Ryu M, Choi HJ. Link-based similarity measures using reachability vectors. ScientificWorldJournal. Feb. 18, 2014;2014:741608. doi: 10.1155/2014/741608. PMID: 24701188; PMCID: PMC3948467. (Year: 2014).*

(Continued)

*Primary Examiner* — Marie P Brady
(74) *Attorney, Agent, or Firm* — MARSHALL, GERSTEIN & BORUN LLP

(57) ABSTRACT

Systems and methods are described for generating efficient iterative electronic recommendation structures. In various aspects, one or more processors aggregate a plurality of ratings vectors, where each ratings vector is associated with a vector type and contains one or more content ranking metrics associated with one or more users. The one or more processors generate similarity pairing values from the plurality of ratings vectors, where each similarity pairing value is based on a similarity mapping between a first ratings vector and a second ratings vector. The one or more processors further generate an electronic recommendation structure based on the similarity pairing values, where the electronic recommendation structure includes a bi-directional look-up interface that is configured to return a bi- (Continued)

directional recommendation value after receiving a lookup request for either the vector type of the first ratings vector or the vector type of the second ratings vector.

20 Claims, 18 Drawing Sheets

(51) Int. Cl.
*G06Q 30/0204* (2023.01)
*G06Q 30/0201* (2023.01)

(56) References Cited

U.S. PATENT DOCUMENTS

| | | | | |
|---|---|---|---|---|
| 2011/0179012 | A1 | 7/2011 | Pedersen | |
| 2011/0238525 | A1* | 9/2011 | Linden | G06Q 30/02 705/26.7 |
| 2012/0030159 | A1 | 2/2012 | Pilaszy et al. | |
| 2012/0259687 | A1* | 10/2012 | Kajamohideen | G06Q 30/0601 705/347 |
| 2014/0129371 | A1* | 5/2014 | Wilson | G06Q 30/0631 705/26.7 |
| 2014/0180790 | A1 | 6/2014 | Boal | |
| 2014/0279196 | A1* | 9/2014 | Wilson | G06Q 30/0631 705/26.7 |
| 2016/0147799 | A1 | 5/2016 | Cohen et al. | |
| 2017/0103133 | A1* | 4/2017 | Xiong | G06F 16/9535 |
| 2018/0165725 | A1 | 6/2018 | Embrechts et al. | |
| 2019/0042585 | A1 | 2/2019 | Ploshykhyn | |
| 2019/0050872 | A1* | 2/2019 | Yu | G06N 7/01 |

FOREIGN PATENT DOCUMENTS

| | | | | |
|---|---|---|---|---|
| WO | WO-2007/070370 | A2 | 6/2007 | |
| WO | WO-2007070370 | A2 * | 6/2007 | G06F 17/30705 |
| WO | WO-2016/189317 | A1 | 12/2016 | |
| WO | WO-2016189317 | A1 * | 12/2016 | A63F 13/30 |

OTHER PUBLICATIONS

Eichler et al., Recommendation as a Service (Raas) New Challenges for, and Evaluation Metrics of Recommender Systems, 2013, 2013 17th International Conference on Intelligence in Next Generation Networks (ICIN), pp. 1-8.
Gupta et al., WTF: The Who to Follow Service at Twitter, International World Wide Web Conference, Committee, WWW 2013, May 13-17, 2012, p. 505-514.
Krenzel, Steve, "6. Map Reduce", http://stevekrenzel.com/finding-friends-with-mapreduce, Apr. 16, 2018, p. 1-6.
Linden et al., "Amazon.com Recommendations, Item-to-Item Collaborative Filtering", IEEE Internet Computing, 76-80 (2003).
Zhao et al., Pipline Item-based Collaborative Filtering based on MapReduce, 2015 IEEE Fifth International Conference on Big Data and Cloud Computing, 2015, p. 9-14.

* cited by examiner

602

Example 1: Similarity Pairing Value
Ratings Vector 1 (Offer 1) = {1, 0, 1, NaN}
Ratings Vector 2 (Offer 2) = {0, 1, NaN, 1}
*Ignoring/Skipping pairs with NaN values sim (Offer 1, Offer 2) = 0

Example 2: Similarity Pairing Value
Ratings Vector 1 (Offer 1) = {1, 0, 1, NaN}
Ratings Vector 3 (Offer 3) = {NaN, 0, 1, 0}
*Ignoring/Skipping pairs with NaN values sim (Offer 1, Offer 3) = 1

Example 3: Similarity Pairing Value
Ratings Vector 2 (Offer 2) = {0, 1, NaN,1}
Ratings Vector 3 (Offer 3) = {NaN, 0, 1, 0}
*Ignoring/Skipping pairs with NaN values sim (Offer 2, Offer 3) = 0

FIG. 6C

Recommendation Structure (item-to-item based)

[Dictionary Embodiment]

800

| Bi-directional Key Value (802) | Similarity Pairing Values (804) | |
|---|---|---|
| Offer1-2 | 0 | 602 |
| Offer1-3 | 1 | 604 |
| Offer2-3 | 0 | 606 |

Example 1: Content-based Similarity Pairing Value

Attribute Content Vector 1 (Offer 1) = [1,0,1,0]

Attribute Content Vector 2 (Offer 2) = [0,1,0,1]

sim (Offer 1, Offer 2) = 0

Example 2: Content-based Similarity Pairing Value

Attribute Content Vector 1 (Offer 1) = [1,0,1,0]

Attribute Content Vector 3 (Offer 3) = [0,0,1,0]

sim (Offer 1, Offer 3) = 0.7071

Example 3: Content-based Similarity Pairing Value

Attribute Content Vector 2 (Offer 2) = [0,1,0,1]

Attribute Content Vector 3 (Offer 3) = [0,0,1,0]

sim (Offer 2, Offer 3) = 0

FIG. 11C

| User # | Offer 1 | Offer 2 | Offer 3 |
|---|---|---|---|
| 1 | 1 | 0 | NaN |
| 2 | 0 | 1 | 0 |

| User # | Offer 1 | Offer 2 | Offer 3 |
|---|---|---|---|
| 2 | 0 | 1 | 0 |
| 3 | 1 | NaN | 1 |
| 4 | NaN | 1 | 0 |

Parallel processing for generating a recommendation structure — 1402

| Ratings Ranking Metrics Grouping | <Offer 1, Offer 2> | <Offer 1, Offer 3> | <Offer 2, Offer 3> |
|---|---|---|---|
| 1_2 | PartialSim (...) = 0 | PartialSim (...) = NaN | PartialSim (...) = NaN |

First Set of Partial Similarity Pairing Values 1404, 1405, 1406, 1408, 1410

FIG. 14A

| Ratings Ranking Metrics Grouping | <Offer 1, Offer 2> | <Offer 1, Offer 3> | <Offer 2, Offer 3> |
|---|---|---|---|
| 2_4 | PartialSim (...) = NaN | PartialSim (...) = 1 | PartialSim (...) = 0 |

Second Set of Partial Similarity Pairing Values 1414, 1415, 1416, 1418, 1420

FIG. 14B

SYSTEMS AND METHODS FOR GENERATING EFFICIENT ITERATIVE RECOMMENDATION STRUCTURES

CROSS REFERENCE TO RELATED APPLICATION(S)

This application claims the benefit of U.S. application Ser. No. 15/991,544 (filed on May 29, 2018). The entirety of the foregoing application is incorporated by reference herein.

FIELD OF THE DISCLOSURE

The present disclosure generally relates to efficient iterative recommendation structures, and, more particularly, to recommender systems and methods for generating efficient iterative electronic recommendation structures, and, to client-based recommender systems and methods for providing user offers based on the efficient iterative recommendation structures.

BACKGROUND

A business or company that provides business-to-consumer (B2C) products or services, at times, may experience low or negative "touch," or otherwise interaction, with its customers or users of the business's or company's products or services. Such low interaction may create undesirable or uncontrollable user perceptions of the company, where such the company's customers or users, experiencing low or negative touch, form negative opinions of the company based on general characteristics. Such characteristics may stem from the general nature of the company's products or services, such as the possible high cost of the company's products or services, the responsiveness of the company to meet the consumer's needs in industries with high sensitivity, or high emotion, based services (e.g., insurance in disaster scenarios), or, an overall negative association with a specific industry in general. Such negative perceptions can cause customers to switch to competitor product or services, and, thus, negatively impact the company's business and revenues.

BRIEF SUMMARY

For the foregoing reasons, there is a need for developing high, or positive touch, relationships with customers for companies in such industries in order to provide a sense of company awareness and presence, and, to foster user brand loyalty. As described in various embodiments herein, brand loyalty and high touch relationships may be developed by systems and methods that are able to routinely offer the customer benefits available from the company and/or available from the company's marketing affiliates. Such benefits may include offering the company's customers discounts, coupons, or other such offers via recommender systems and methods. As described herein, the recommender systems and methods may include recommending offers, offering location-specific discounts, tracking cumulative dollars saved by the company's customer, maintaining a list of clipped offers, and/or transmitting or pushing offers to the customer on a periodic basis to alleviate the need for the customer to search through a benefits or offer catalogue. Each of these benefits may be associated with the company and may provide an avenue to not only build good will with customers, but also stay actively involved with the company's user-base. In this way, the company can maintain positive touch and build brand loyalty with its customers by staying top of mind, and also by providing positive experiences via useful benefits, savings discounts, or other such valuable offers.

Accordingly, in various embodiments, recommender systems and methods are described for generating efficient iterative electronic recommendation structures. As described herein, one or more processors and one or more memories may be configured to aggregate a plurality of ratings vectors. Each ratings vector may be associated with a vector type, and each ratings vector may contain one or more content ranking metrics associated with one or more users. In various embodiments, the vector type may be an offer-based vector type and the content ranking metrics may be associated with user offers.

The one or more processors may be further configured to generate similarity pairing values from the plurality of ratings vectors. Each similarity pairing value may be based on a similarity mapping between a first ratings vector and a second ratings vector. As described herein, the similarity pairing values may be used to generate bi-directional recommendation values.

The one or more processors may be further configured to generate an electronic recommendation structure based on the similarity pairing values. In some embodiments, the electronic recommendation structure may be generated on a periodic basis. In still further embodiments, the electronic recommendation structure may be stored in one or more memories of a server, and may be accessed with a bi-directional key value that is associated with a similarity pairing value.

In various embodiments, the electronic recommendation structure may include a bi-directional look-up interface that is configured to return a bi-directional recommendation value after receiving a lookup request for either the vector type of the first ratings vector or the vector type of the second ratings vector. As described herein, the bi-directional may indicate a likelihood of a user selecting a given offer.

In some embodiments, a first ranking metric of the one or more content ranking metrics may be associated with a first user and may correspond to a first offer associated with the first ratings vector. The first ranking metric may indicate whether the first offer was selected by the first user. In other embodiments, a second ranking metric of the one or more content ranking metrics may also be associated with the first user and may correspond to a second offer associated with the second ratings vector. The second ranking metric may not indicate whether the second offer was selected by the first user. As described herein, the second ranking metric may be updated with a new bi-directional recommendation value that indicates a likelihood of the first user selecting the second offer. The new bi-directional recommendation value may be determined via a request to the bi-directional look-up interface.

In some embodiments the one or more processors may transmit, via a computer network, a recommendation structure to a second set of one or more processors. The second set of one or more processors may access the bi-directional look-up interface of the recommendation structure to determine a new bi-directional recommendation value. In such embodiments, the second set of one or more processors may update a second ranking metric with the new bi-directional recommendation value.

In some embodiments as described herein, at least one similarity pairing value may be generated based on one or more content attribute types. In such embodiments, a first ratings vector may be a first attribute content vector and a second ratings vector may be a second attribute content vector. The first attribute content vector may include a first set of content attribute values corresponding to each content attribute type. Similarly, the second attribute content vector may include a second set of content attribute value corresponding to each content attribute type. In such embodiments, the at least one similarity pairing value may be based on the similarity mapping between the first attribute content vector and the second attribute content vector.

In still further embodiments, a recommendation structure may be generated through transmission of the content ranking metrics to a first executor server and a second executor server. In such embodiments one or more processors may be configured to send, via a computer network, a first set of content ranking metrics to the first executor server, where the first set of content ranking metrics are selected from the content ranking metrics associated with one or more users. Similarly, the one or more processors may further be configured to send, via the computer network, a second set of content ranking metrics to a second executor server, where the second set of content ranking metrics are selected from the content ranking metrics associated with one or more users. The one or more processors may be further configured to receive, from the first executor server, a first set of partial similarity pairing values based on the first set of content ranking metrics. Each partial similarity pairing value of the first set may be based on a similarity mapping between two partial ratings vectors associated with the first set of content ranking metrics. In addition, the one or more processors may be further configured to receive, from the second executor server, a second set of partial similarity pairing values based on the second set of content ranking metrics. Each partial similarity pairing value of the second set may be based on a similarity mapping between two partial ratings vectors associated with the second set of content ranking metrics. In such embodiments, the electronic recommendation structure may be generated based on merging the first set of partial similarity pairing values and the second set of partial similarity pairing values. The electronic recommendation structure may also be stored in the one or more memories of the first server.

As described herein, the recommendation structures provide efficient systems and methods for providing bi-directional recommendation values because the bi-directional nature of the systems and methods allows for storage of fewer keys compared with a system that is not bi-directional. This provides for reduced key-value pairs and, therefore, uses reduced storage space in computer memory. In addition, the bi-directional recommendation structures allow for extremely rapid look-ups (e.g., in some embodiments, the recommendation structures may be implemented as a graph or dictionary, and so may provide near-constant access time).

In additional embodiments, client-based recommender systems and methods are disclosed for providing user offers based on efficient iterative recommendation structures. In such embodiments, a server may invoke a bi-directional look-up interface via a lookup request. The bi-directional look-up interface may be exposed via an electronic recommendation structure, where the lookup request causes the bi-directional look-up interface to return a bi-directional recommendation value. The bi-directional recommendation value may be determined from a similarity mapping between a first ratings vector associated with the first offer and a second ratings vector associated with the second offer.

The bi-directional recommendation value may be transmitted via a computer network to a client device associated with the first user upon a determination that the likelihood meets or exceeds a recommendation threshold. The client device may be operative to display at least one of the first offer or the second offer. In some embodiments the client device may be operative to filter offers based on an offer type. In other embodiments, the client device may be operative to identify offers based on a geographical location.

In some embodiments, the server may receive, via the computer network, an indication that the first user selected the first offer. In other embodiments, the indication that the first user selected the first offer may cause the first offer to be indicated as a clipped offer on the client device. In other embodiments, the indication that the first user selected the first offer may cause the server to associate the first offer with the user. In still further embodiments, the indication that the first user selected the first offer may cause the server to update the recommendation structure.

In some embodiments the client device is operative to display an amount of clipped offers associated with the first user. In other embodiments, the client device is operative to display a list of clipped offers associated with the first user.

In some embodiments the server may update the recommendation structure automatically on a periodic basis. The update may include regenerating the recommendation structure to create an updated recommendation structure based on content ranking metrics available to the server at the time of the update.

In various aspects, an update to the recommendation structure may cause the server to invoke an updated bi-directional look-up interface of the updated recommendation structure. The invocation of the updated bi-directional look-up interface may cause the server to transmit a new bi-directional recommendation value to the client device. In further embodiments the invocation of the bi-directional look-up interface may be caused by the client device transmitting, via the computer network, a client request to the server.

Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein:

FIGS. 6A-6C illustrate example embodiments of similarity pairing values in accordance with the item-to-item recommender of FIG. 5.

FIG. 8 illustrates a dictionary embodiment of an item-to-item based recommendation structure generated from the similarity pairing values of FIGS. 6A-6C.

FIGS. 11A-11C illustrate example embodiments of content-based similarity pairing values in accordance with the content-based recommender of FIG. 10.

FIG. 14A-14B illustrates embodiments of sets of partial similarity pairing values generated during the parallel processing embodiment of FIG. 13.

The Figures depict preferred embodiments for purposes of illustration only. Alternative embodiments of the systems and methods illustrated herein may be employed without departing from the principles of the invention described herein.

DETAILED DESCRIPTION

Figure 1:
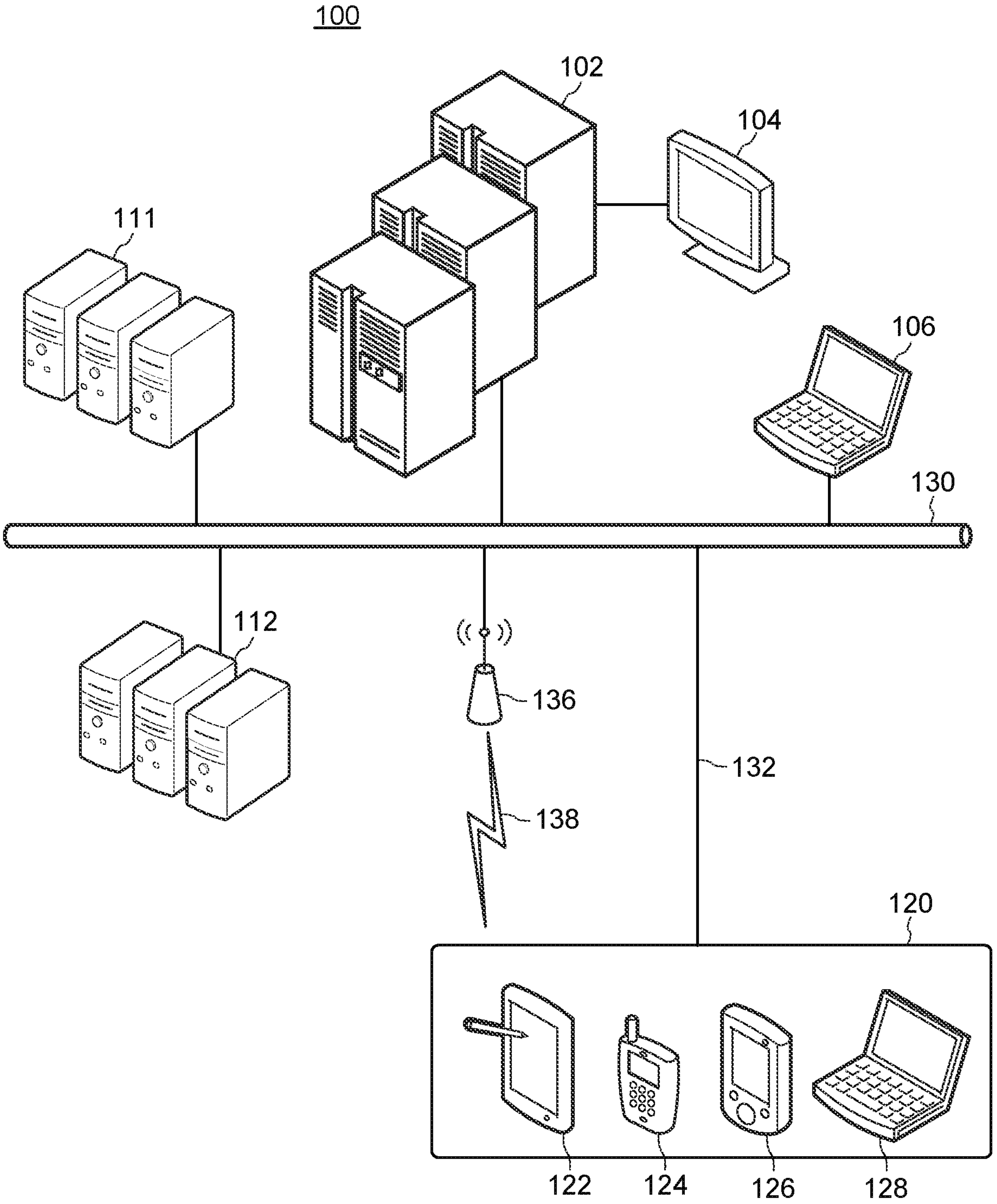
FIG. 1 illustrates an example of a computer network diagram that includes an embodiment of a recommender system in accordance with various aspects of the present disclosure.

FIG. 1 illustrates an example of a computer network diagram 100 that includes an embodiment of a recommender system in accordance with various aspects of the present disclosure. The computer network diagram 100 depicts several servers 102, 111, 112. Servers 102, 111, and 112 are each connected via computer network 130 and wireless network 136 to client devices 104, 106, and 120. The computer network 130 may be a private network or a public network, for example, the Internet. The various servers and clients may communicate via data transmission packets or frames, such as those used with the Transmission Control Protocol (TCP) and Internet Protocol (IP) of the TCP/IP standard. The wireless network 136 may include a cellular or mobile phone network. Wireless data transmissions 138 may be made via the wireless network 136 using any of the wireless or cellular transmission standards, including, for example, Global Systems for Mobile communications (GSM), Code Division Multiple Access (CDMA), and/or Long Term Evolution (LTE). The wireless network may be communicatively connected to the computer network 130 for data transmission via the computer network 130 as described herein.

The computer network diagram 100 further depicts recommender server(s) 102. Recommender server(s) 102 may be one or more computer servers, where each of recommender server(s) 102 may include one or more processors and one or more computer memories for generating efficient iterative electronic recommendation structures, and for providing user offers based on the efficient iterative recommendation structures, as described herein. In some embodiments, the recommender server(s) 102 may be accessed locally via a local client device 104 that may be collocated at the same facility or company as the recommender server(s) 102. In other embodiments, the recommender server(s) 102 may also be accessed remotely via a remote client device 106 that may be located remote from the facility or company that the recommender server(s) 102 are located. The local client device 104 and/or the remote client device 106 may be operated by an employee, administrator, or other personnel that has access to the recommender server(s) 102 in order to, for example, provide maintenance to, change settings of, or otherwise set the general operation of, the recommender server(s) 102 as described herein. For example, an administrator may access the recommender server(s) via the remote client device 106 to set how often the recommender server(s) 102 generates recommendation structures, or how often, or when, the recommender server(s) 102 should transmit bi-directional recommendation values, as described herein.

For example, as described herein, a bi-directional look-up interface may be invoked on the recommender server(s) 102 via a lookup request. The bi-directional look-up interface may be part of and/or exposed via an electronic recommendation structure as a programmatic or network-based application programming interface (API) as described herein. In various embodiments, the lookup request may cause the bi-directional look-up interface to return a bi-directional recommendation value. The bi-directional recommendation value may indicate a likelihood of a first user selecting a first offer or a second offer. In various embodiments, the bi-directional recommendation value may be determined from a similarity mapping between a first ratings vector associated with the first offer and a second ratings vector associated with the second offer.

The recommender server(s) 102 may determine that the likelihood of the bi-directional recommendation value meets or exceeds a recommendation threshold. Upon the determination that the recommendation threshold is met, the recommender server(s) 102 may transmit the bi-directional recommendation value to a client device 120 for display. The client device 120 may be, for example, a tablet device 122, a mobile phone 124, a smart phone 126, a laptop 128, or any other similar computing device containing one or more processors and one or more memories for operating in accordance with the embodiments disclosed herein. The client devices may include mobile devices such an Apple iPhone or iPad operating on the Apple iOS platform, a Samsung Galaxy phone operating on the Google Android platform, a MacBook operating on the MacOS platform, or a laptop operating on the Microsoft Windows operating system, etc. Each of the client devices 120 may also include a display screen. The display screen of the client devices may be operative to display offers, discounts, or other information sent by the recommender server(s) 102 to the client devices 120, and may further be operative to receive user selections as described herein. Each of the client devices 120 may be connected to the computer network 130 via either a wireless 138 or wired 132 connection using any of the data transmission standards and/or wireless transmissions standards as described herein.

In some embodiments the recommendation threshold may be set as a global value (e.g., 75%) for all users, where the likelihood of the first user selecting the first or second offer must meet or exceed 75% in order for the recommender server(s) 102 to transmit bi-directional recommendation values to a client device 120. In other embodiments, for example, the recommendation threshold may be set as a custom value for a specific user, such as the first user, where the custom value is set by the user, or set for the user by the recommender server(s) 102 or its operators, where a custom value (e.g., 50%) defines a tolerance for the first user in order for the recommender server(s) 102 to transmit recommended offers. In some embodiments, the recommendation threshold may be set at 100% or "1," indicating a true value, e.g., for Boolean type recommendations that are transmitted when an offer is identified as a good fit for the user. In such embodiments, offers with "0" values would not be transmitted.

In other embodiments, the recommendation threshold may be specified for use with the client device 120. In such embodiments, the bi-directional recommendation structures (e.g., FIGS. 7 and/or 8) and/or bi-directional recommendation values may be transmitted to the client device 120, where the client device 120 may use the bi-directional recommendation structure(s) and/or bi-directional recommendation values to display bi-directional recommendation values to a user of the client device 120. In some embodiments, the client device 120 may use the recommendation threshold to determine whether to display a particular bi-directional recommendation value to a user. For example, the client device 120 may have received a particular bi-directional recommendation value with a value of 43%, and the client 120 would operate to show the particular bi-directional recommendation value if the threshold on the client 120 was set at 40%, but would not operate to show the particular bi-directional recommendation value if the threshold on the client 120 was set at 50%.

In other embodiments, the recommender server(s) 102 may work with other servers, for example, executor servers 111 and/or 112, to generate recommendation structures, update content ranking metrics, etc. in a parallel or near-parallel computational manner. For example, as described herein, some embodiments may involve parallel processing or parallel computing which may include sending an item-to-item based recommender, a content-based recommender, ratings vectors, user ranking metrics, recommendation structures, and/or other such recommenders, metrics, or information as described herein, to secondary processors (e.g., on servers, e.g., executor servers 111 and/or 112) to collectively determine, generate, or perform the functionality (e.g., updating content ranking metrics or generating recommendation structures) at the same time or at about the same time. Such parallel processing allows the recommender server(s) 102 to share the computational workload with executor servers 111 and/or 112, and, thereby, increase the efficiency and speed of the overall computational task, especially when there are a large number of content ranking metrics, ratings vectors, or other such information that can be more quickly processed by multiple processors executing across multiple servers. In some parallel processing embodiments, a first server, such as a server of the recommender server(s) 102 may transmit the content recommenders, recommendation structures, user ranking metrics, and/or ratings vectors, etc. to a second set of multiple processors (e.g., executor servers 111 and/or 112), and the second set of multiple processors, may perform the required execution and then return results ("reduced" results) back to the first server. The first server may then execute additional instructions with respect to the returned results, e.g., to update content ranking metrics or generate recommendation structures as described herein.

In other embodiments, the recommender server(s) 102 may operate to provide the same functionality as the parallel processing embodiments, but without use of the executor servers 111 and/or 112. For example, a single server of the recommender server(s) 102 may be responsible for updating content ranking metrics or generating recommendation structures as described herein. In other embodiments, two or more of the recommender server(s) 102 may perform parallel processing as described above, but where a first server of the recommender server(s) 102 transmits the content ranking metrics, recommendation structures, etc. to a second and third server of the recommender server(s) 102 for parallel computation processing as described herein.

In other embodiments, the recommender server(s) 102 may perform batch processing to update the recommendation structures on a periodic basis as described herein. The recommender server(s) 102 may invoke, on a periodic basis, a bi-directional look-up interface of a recommendation structure. The invocation may return one or more bi-directional lookup values to be returned, and the recommender server(s) 102 may transmit the bi-directional recommendation values to client devices (e.g., client devices 120). In some embodiments, the bi-directional recommendation values may be based on a constantly updated version of a recommendation structure. In some embodiments, the bi-directional recommendation values may be based on a "stale" recommendation structure, where such stale recommendation structure may not have been recently updated with respect to the current user ranking metrics currently available to the recommender server(s) 102.

FIGS. 2A, 2B, 3, 4A, and 4B depict various embodiments of display screens in accordance with aspects of the present disclosure. Each of the display screens of 2A, 2B, 3, 4A, and 4B may be may be displayed on a client device 120, for example, smartphone 126, which may be a user's smartphone or other mobile device such as an Apple iPhone operating on the iOS platform, a Samsung Galaxy phone operating on the Google Android platform, or any other such mobile device. Each of the display screens, and their underlying logic and source code, may be implemented via various programming languages for their respective operating system platform, which may include the Swift and/or Objective-C programming languages for the Apple iOS platform or the Java programming language for Google Android platform. For example, a client device 120 may be provided such programmatic instructions, in the form of a downloadable application ("App"), which are programmed in these various languages. The App may cause the client device 120 to communicate, via data transmission across computer network 130, in order to provide user offers based on the efficient iterative recommendation structures as described herein. For example, in various embodiments, a recommender App having each of the display screens of 2A, 2B, 3, 4A, and 4B may be downloaded via the Apple App Store and installed on a user's client device 120 (e.g., an Apple iPhone) for use with the recommender server(s) 102 as described herein.

Figure 2A:
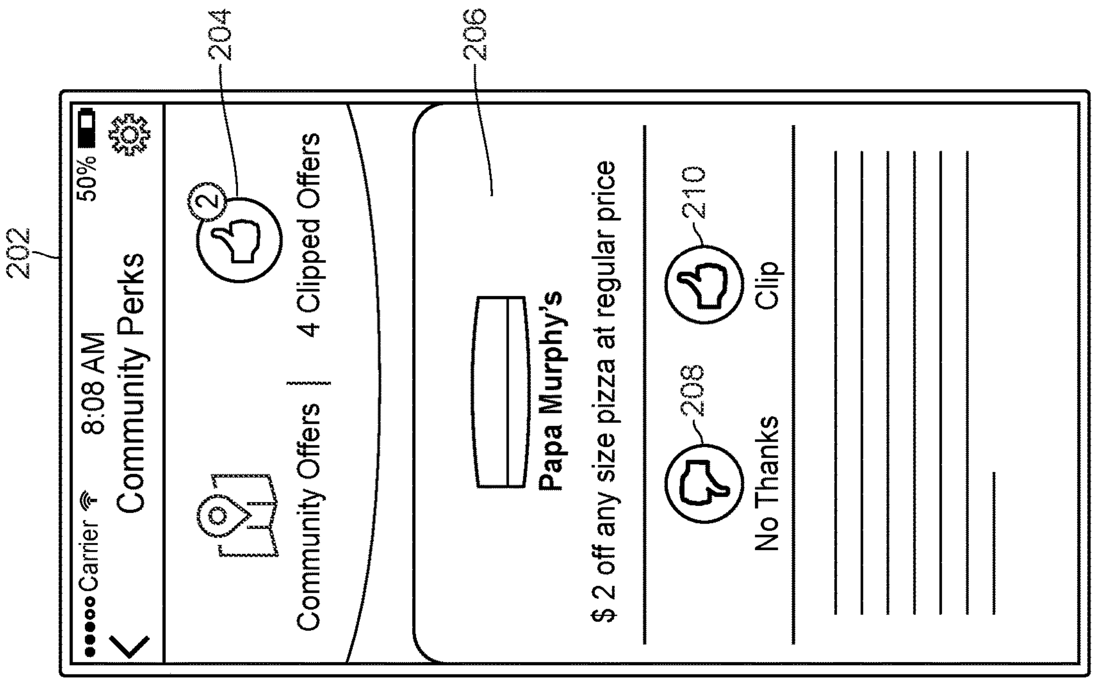
FIG. 2A illustrates an embodiment of an offer and selection display screen of a client device of FIG. 1.

FIG. 2A illustrates an embodiment of an offer and selection display screen 202 of a client 120 device of FIG. 1. The offer and selection display screen 202 includes a clipped offers icon 204. The clipped offers icon indicates a current amount of offers (e.g., "4 clipped offers" in the present embodiment) that the user selected or "clipped" using the recommender App. The clipped offers may represent the specific offers that were selected by the user as the user interacted with the recommender App on a periodic basis, e.g., hourly, daily, weekly, etc.

The offer and selection display screen 202 may also include a current offer 206. Current offers may represent offers from the company providing the recommender App or from third-party merchants affiliated with the company providing the recommender App. In other embodiments, current offers may be provided by third-party merchants that are offering discounts, coupons, etc. and that company providing the recommender App has identified and simply relays via the recommender system to the user in order to provide additional, high touch benefits to the user as described herein.

In the embodiment of FIG. 2A, current offer 206 is represented as an offer from Papa Murphy's for "$2 off any size pizza at regular price." The user has the option of either selecting the current offer 206 via the thumbs-up icon 210 or declining the current offer 206 via the thumbs-down icon 208. In various embodiments, a user's selection of the thumbs-up icon 210 will cause the recommender system to "clip," store, or otherwise associate the user's selection, and related offer, with the user, for example, on one or more computer memories of the client device 120 or recommender server(s) 102. The selection may cause a data transmission via the computer network 130, indicating the user's selection of the thumbs-up icon 210 or the thumbs-down icon 208, to the recommender server(s) 102. The indication that the first user selected the current offer 206 may cause the current offer 206 to be stored on the client device 120 or on the recommender server(s) 102. In addition, in various embodiments, the indication that the user selected the current offer 206 may cause the recommender server(s) to update the user's related content ranking metrics, and the corresponding recommendation structure as described herein. For example, the recommendation structure may be updated to incorporate the user's selection as content ranking metrics, and to reflect whether the user choose to select the offer (e.g., via the thumbs-up icon 210) or to decline the offer (e.g., via the thumbs-down icon 208). A newly generated or updated recommendation structure that incorporates the user's selection may provide more accurate bi-directional recommendation values to the user and other users.

The user, using the recommender App, may also access and use the current offer 206, for example, by presenting the current offer 206 to the company providing the recommender App or a third-party merchant. For example, in the embodiment of FIG. 2A, a user that has clipped the current offer 206 may present the clipped current offer 206 to an employee or personnel at a Papa Murphy's location in order to receive $2 off any size pizza at regular price.

Figure 2B:
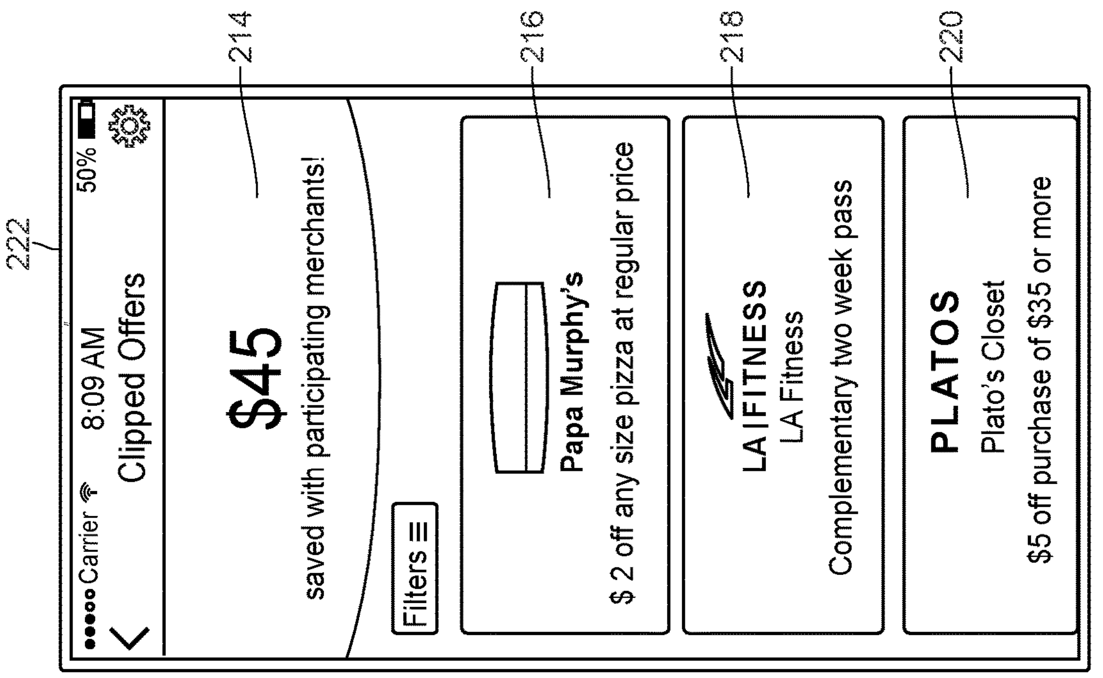
FIG. 2B illustrates an embodiment of a wallet display screen of a client device of FIG. 1.

FIG. 2B illustrates an embodiment of a wallet display screen 212 of a client device 120 of FIG. 1. The wallet display screen 212 shows a reminder 214 of how much the recommender systems and methods (and the company providing the associated recommender App) has saved the user. The reminder 214 can be based on money saved via offers (e.g., current offer 206) that the user has previously benefited from. In the embodiment of FIG. 2B, the reminder 214 indicates that the user of the recommender App has so far saved $45 via offers used to purchase goods/services from participating merchants. The wallet display screen 212 also displays a list of clipped offers (216-220) associated with the user. For example, the list of clipped offers 216-220 includes offers that the user has clipped using the offer and selection display screen 202 as described herein. For example, the wallet display screen 212 includes offer 216 (regarding Papa Murphy's offer) which may correspond to the user's decision to select and clip current offer 206 (the same Papa Murphy's offer) from the offer and selection display screen 202 as described for FIG. 2A. Other offers that the user has clipped are also shown in the list of wallet display screen 212. For example, a second offer 218 is clipped from merchant LA Fitness, where the second offer 218 provides a complementary two week pass for the user to use an exercise or workout facility, or other services (e.g., Yoga or Pilates classes), provided by LA Fitness. In addition, a third offer 220 is clipped from merchant Plato's Closet, where the third offer 220 provides a $5 off coupon when the user purchases of $35 or more of Plato's Closet retail products, which may include clothing, accessories, or other retail products, available at Plato's Closet stores, locations, online websites, etc.

Figure 3:
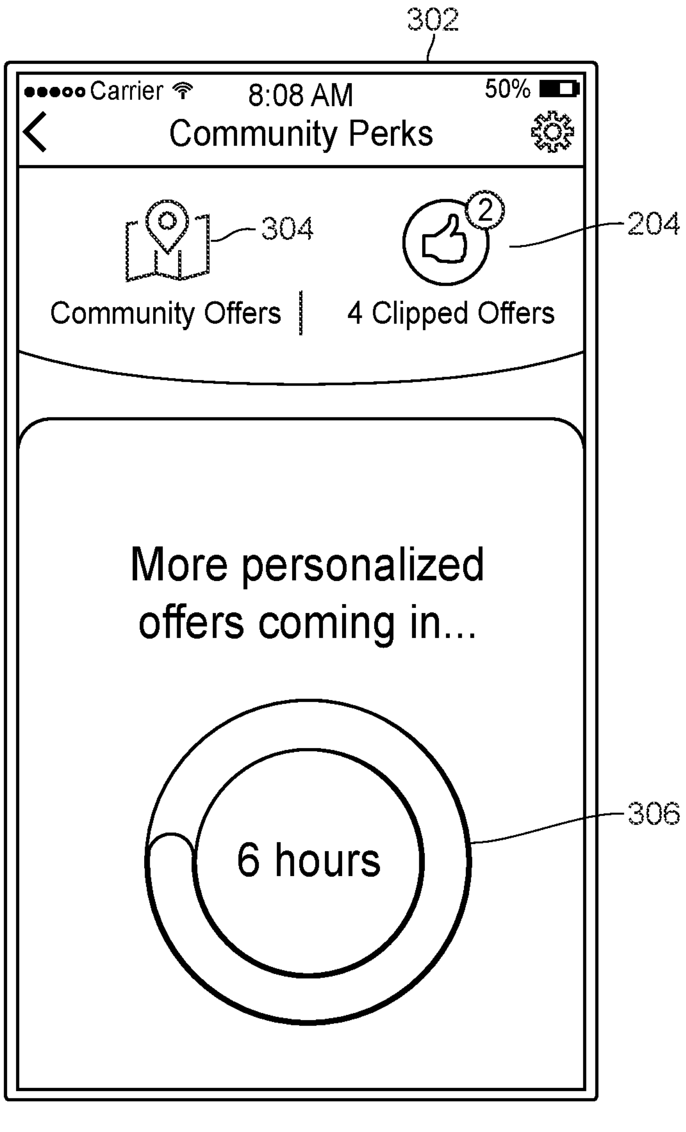
FIG. 3 illustrates an embodiment of an offer update display screen of a client device of FIG. 1.

FIG. 3 illustrates an embodiment of an offer update display screen 302 of a client device 120 of FIG. 1. The offer update display screen 302 includes a community offers icon 304 which launches a geography-based offer display screen 412, entitled "community offers," of FIG. 4B as described further herein. The offer update display screen 302 also includes the clipped offers icon 204, which display the amount or number of clipped offers that the user has clipped, as was described for FIG. 2A herein. In addition, the offer update display screen 302 includes an update indicator 306 that indicates when new offers will be recommended or otherwise provide to the recommender App. The recommended offers may be provided from the recommender server(s) 102 based on recommendation structures as provided herein. For example, the recommender server(s) 102 may invoke a bi-directional look-up interface of the recommendation structure which causes the recommender server(s) 102 to transmit a new bi-directional recommendation value to the user's client device 120.

In some embodiments, the invocation by the recommender server(s) may be performed automatically on a periodic basis, where the recommender server(s) 102 update recommendation structure at certain time intervals (e.g., within "6 hour" cycles as exemplified by the update indicator 306). The updated recommendation structure may be created by regenerating a stale, or older, recommendation structure to create an updated recommendation structure. The newly updated recommendation structure may be based on the currently available content ranking metrics associated with one or more user selections offers, etc. This may include new content ranking metrics that were not available to the server at the time of the update. For example, the current content ranking metrics at the time of the update may incorporate new user selections that were not available at the time of the most previous version of the recommendation structure. The newly updated recommendation structure may become the current version of the recommendation structure that may be used to provide a next round of offers and their related bi-directional recommendation values, etc. Accordingly, the recommender servers(s) 102 may operate to continuously create efficient and iterative recommendation structures that can be used to provide offers to users on a continuous basis. This helps facilitate a high touch, high interaction between the company and its users.

In other embodiments, the invocation of the bi-directional look-up interface on the recommender server(s) 102 may be caused by the client device transmitting, via the computer network, a client request to the server. For example, the user, operating the recommender App, may request new offers. The request may be sent from the user's client device 120 to a Representational State Transfer (REST) ("RESTful") API that exposes the current recommendation structure on the recommender server(s) 102. The RESTful API may access a local API, e.g., a Java-based API, on the recommender server(s) 102 to invoke the bi-directional look-up interface, and return bi-directional recommendation values and related offers from the recommendation structure. The bi-directional recommendation values and related offers may then be transmitted to user's client device 120 so that the user may view the offers on his or her client device 120 and decide whether to select to clip (or decline) the offers as described herein.

Figure 4A:
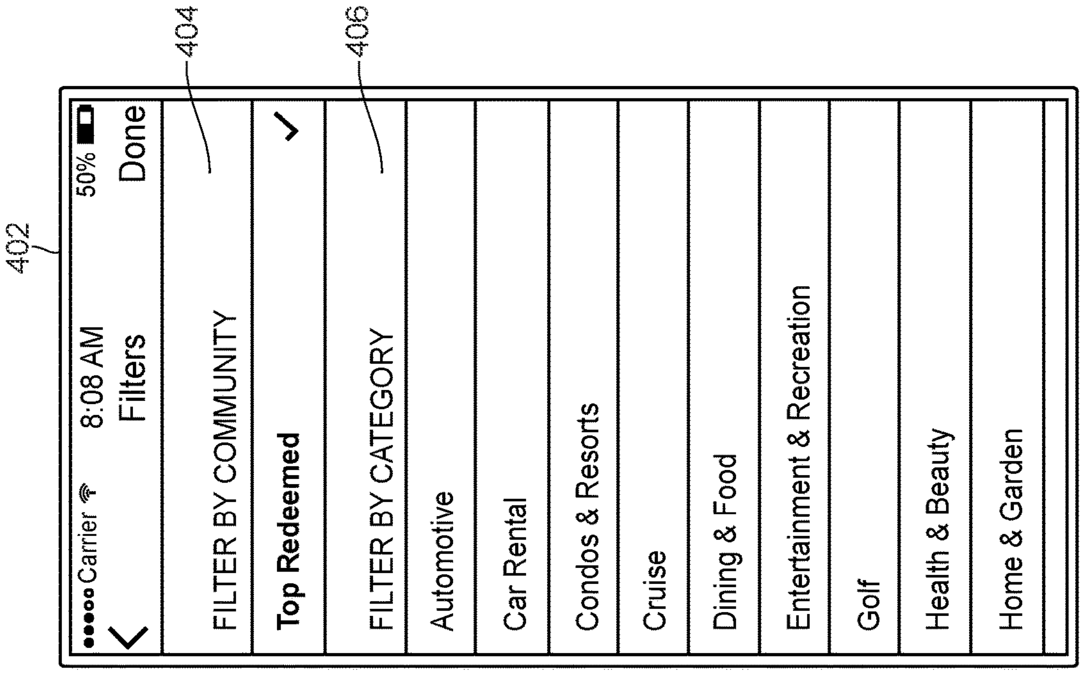
FIG. 4A illustrates an embodiment of an offer filter display screen of a client device of FIG. 1.

FIG. 4A illustrates an embodiment of an offer filter display screen 402 of a client device 120 of FIG. 1. In some embodiment, the client device 120 may be configured to filter offers based on offer types. For example, the client device may filter by community, filter by category, etc. As shown in the embodiment of FIG. 4A, the offer filter display screen 402 is designed to filter by community offers 404, where the user has chosen to filter all offers except those top redeemed (e.g., the highest quantity) offers chosen by other users in the user's community. The embodiment of FIG. 4A further shows that the offer filter display screen 402 is further designed to filter by category 406 (e.g., automotive, car rental, condos & resorts, etc.), where only offers fitting those specific categories would be presented to the user. In various filter-based embodiments, filtered offers will not be displayed by the client device. In some embodiments, the client device 120 may be programmed to not display filtered offers to the user. In alternate embodiments, the selection of the filters on the offer filter display screen 402 causes an indication of the user's filter selection(s) to be transmitted and stored on the recommender server(s) 102. In such embodiments, the recommender server(s) 102 do not transmit filtered offers to the user in the first instance, so that such offers are simply not available to, and therefore not presented to, the user on the client device 120.

Figure 4B:
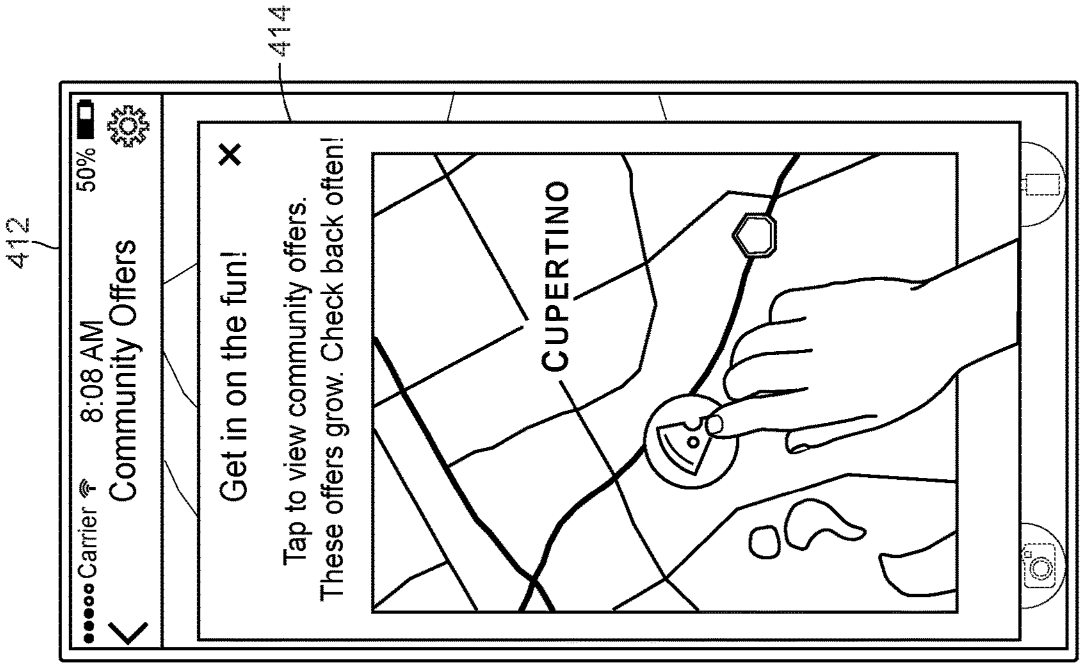
FIGS. 4B-D illustrate embodiments of geography-based offer display screens of a client device of FIG. 1.
Figure 4D:
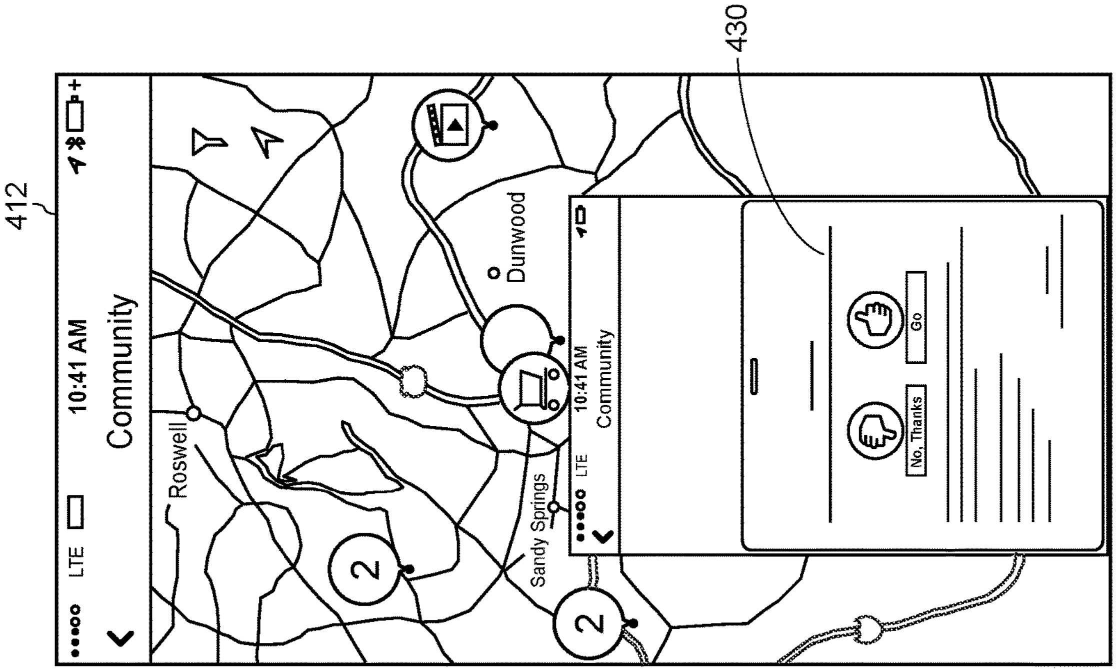
Figure 4C:
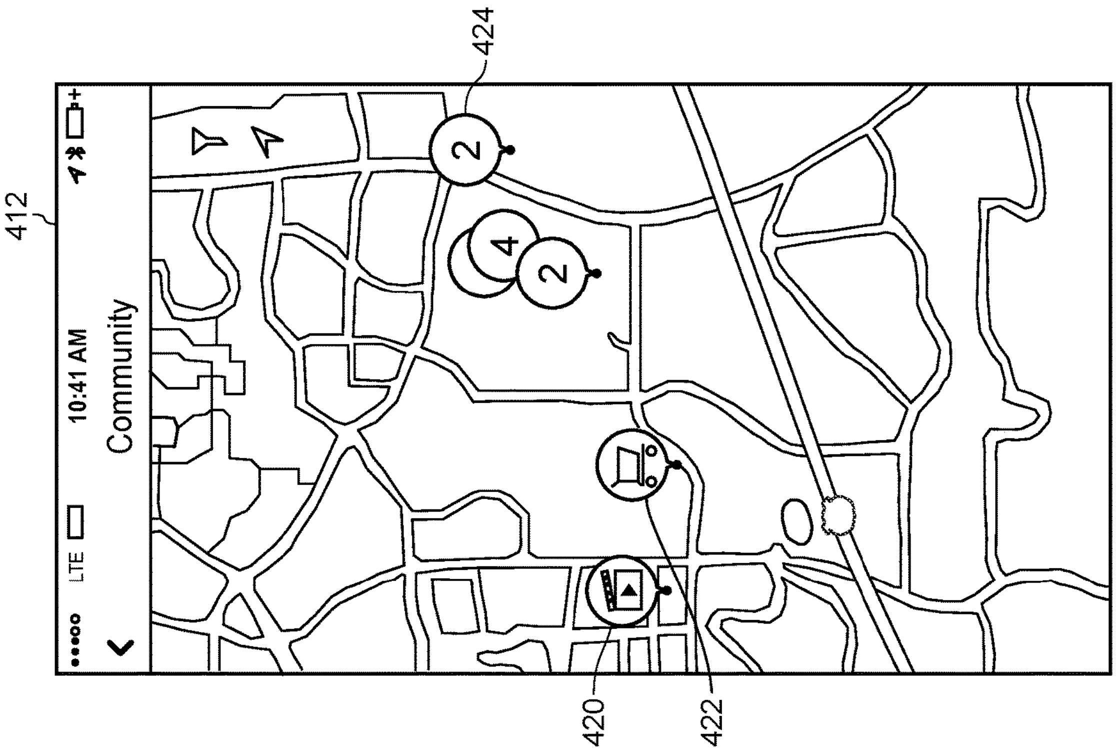

FIGS. 4B-D illustrate embodiments of geography-based offer display screens, e.g., geography-based offer display screen 412, entitled "community offers," of a client device 120 of FIG. 1. The geography-based offer display screen 412 is configured to identify offers based on a geographical location. For example, as depicted in the embodiment of FIG. 4B, the geography-based offer display screen 412 is programmed to allow the user to view geography-based (i.e., "community" based) offers 414 on a map as shown in FIG. 4B. In such embodiments, as shown for the geography-based offer 414, the user may locate offers, such offers from restaurants (e.g., the Papa Murphy's current offer 206 regarding Pizza of FIG. 2A) that appear on the map. In various embodiments, the map may be associated with the user's current location, may be associated with a location that the user is traveling to, and/or may be associated with a location that the user is not currently near, but that the user desires to investigate for possible further purchases in that location. For example, as shown in FIG. 4C a user may be shown offers for a specific region, e.g., an movie theater based offer 420 and a retail shopping based offer 422 located in the specific region shown by the map of screen 412. In some embodiments, users may be shown offers that other users have been shown for the specific geographic area. In addition, as shown in the embodiment of FIG. 4C, some offers be from merchants in a similarly situated or located areas (e.g., a shopping mall area), where such offers are displayed as grouped offers, such as grouped offer 424 (showing "2" offers for the group). As shown in the embodiment of FIG. 4D, the user may select a grouped offer 424 to see each of the specific offers, e.g., offer 430, that below to the given group, or, in other embodiments the offer 430 may be shown where a user selects a non-grouped offer, e.g., offer 420 or 422. In still further embodiments, the map, as shown in FIGS. 4B-D, will not show offers that a user has already seen.

Figure 5:
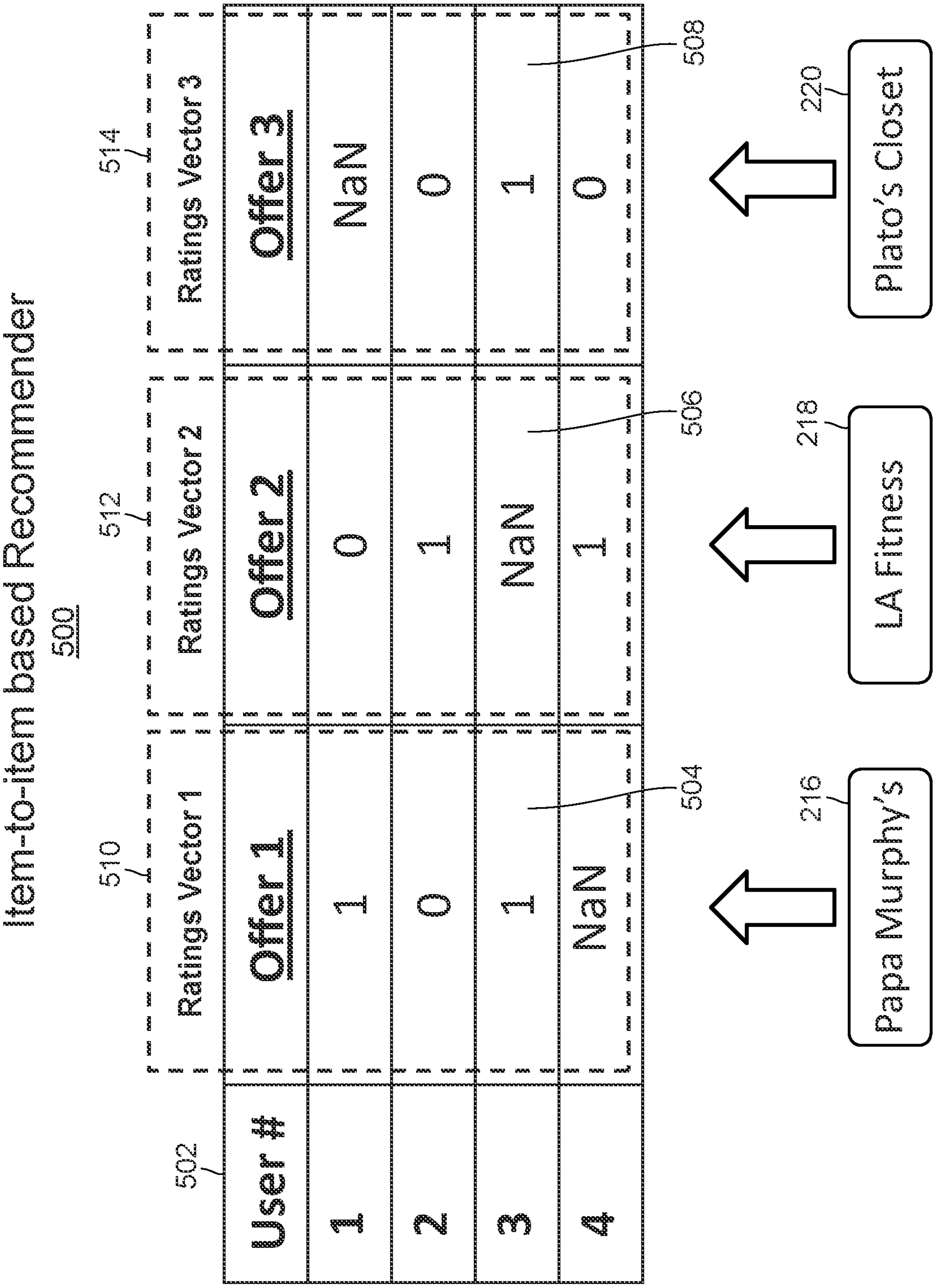
FIG. 5 illustrates an embodiment of an item-to-item recommender of the recommender system of FIG. 1 that includes a plurality of ratings vectors and content ranking metrics associated with one or more users.

FIG. 5 illustrates an embodiment of an item-to-item recommender 500 of the recommender system of FIG. 1 that includes a plurality of ratings vectors and content ranking metrics associated with one or more users. In some embodiments, the item-to-item recommender 500 may be one or more data structure(s) or a data object(s) in one or memories of the recommender server(s) 102, such as a database. The item-to-item recommender 500 stores content ranking metrics, such as user selections, and accordingly provides the recommender system the ability to predict how a user will rate an item (e.g., an offer), or if a user will select an offer, that the user has not yet rated or otherwise seen or interacted with. For example, the item-to-item recommender 500 may assume that there exists between each unique item pair (e.g., offer pair) some quantifiable similarity that conveys some information about the users who have rated such items or offers. In this way, a given user is likely to rank (or select) two items in a similar manner to how other users ranked or selected such items or offers. This may be useful in determining items and offers that the user has not yet ranked or experienced, e.g., for the purpose of providing user recommendations, for example, bi-directional recommendation values, as described herein. In some embodiments, the content ranking metrics (e.g., user selections) may be stored together with user predicted values (e.g., bi-directional recommendation values as described herein), for example, in the same item-to-item recommender or other recommender as described herein. In other embodiments, the content ranking metrics (e.g., user selections) are stored separately from the user predicted values (e.g., bi-directional recommendation values as described herein), for example, in different recommenders or different objects or in-memory data structures. In either embodiment, the recommender server(s) 102 may access the same, or the different recommenders or different objects or in-memory data structures, to generate electronic recommendation structures and operate according to the embodiments as described herein. In addition, while the disclosure for the embodiment of FIG. 5 describes vector types in terms of offers, the vector types may be related more generally to any items that may be compared collaboratively based on user selections, input, or review. For example, in other embodiments, the items may include offers, coupons, discounts, products, services, etc.

In the embodiment of FIG. 5, the item-to-item recommender 500 contains a list of users 502 (e.g., users 1-4) and content ranking metrics for those users (i.e., users 1-4), where each content ranking metric is associated with a particular user (i.e., any of the users 1-4) and for a particular vector type (e.g., any of the offers 1-3). For example, in the embodiment of FIG. 5, user 3 has a content ranking metrics 504 and 508 each with a value of "1." The value "1" for each of content ranking metrics 504 and 508 may reflect that user 3 may have ranked, or provided user selections via the thumbs-up icon 210 (of the offer and selection display screen 202 of FIG. 2A), where the value "1" indicates a thumb-up selection. In contrast, a value "0" may indicate a thumbs-down selection, e.g., had the user chosen the thumbs-down icon 208 (e.g., user 2 for offer 1). In addition, because each of the content ranking metrics 504 and 508 include a value "1," this may indicate that user 3 choose to clip offers 1 and 3, respectively, as described herein. In other embodiments, the value "1" of the content ranking metrics 504 and 508 may indicate that the user identified that he or she "liked" those offers.

In some embodiments, the user's selections cause the user's client device (e.g., a client device 120) to store the selections in a memory of the client device, or may cause the user's client device to transmit the selections to remote server(s) (e.g., recommender server(s) 102) for storage at the remote server(s). For example, the selections and/or their respective offers may be associated with the user's account on the server(s) 102. In either embodiment, the user selections are stored or associated as content ranking metrics in the item-to-item recommender 500, and may be used to generate recommendation structures as described herein.

The item-to-item recommender 500 may include, for some users, values (e.g., content ranking metrics) that indicate items or offers that have not yet been rated, selected, or otherwise interacted with. Such values, in the embodiment of item-to-item recommender 500, are shown as "NaN" values, where NaN indicates a "Not-a-number" or a "missing" value. For example, in the embodiment of FIG. 5, the item-to-item recommender 500 contains content ranking metric 506 with a "NaN" value that may indicate that a user 3 has not yet ranked, has not yet determined to select, or has not yet "liked" offer 2.

The item-to-item recommender 500 may further include ratings vectors, which for the embodiment of FIG. 5, are depicted as columns of the content ranking metrics for the specific vector types, e.g., merchant offers (e.g., offers 1-3). Accordingly, the ratings vector 1 510 includes the content ranking metrics for offer 1, which include values {1,0,1, NaN}. Similarly, the ratings vector 2 512 includes the content ranking metrics for offer 2, which include values {0,1,NaN,1}. Finally, the ratings vector 3 514 includes the content ranking metrics for offer 3, which include values {NaN,0,1,0}. In the embodiment of FIG. 5, each of the offers 1-3 may be vector types associated with several merchant offers. For example, the content ranking metrics of ratings vector 1 may correspond to user selections regarding the offer 216 of FIG. 2A relating to Papa Murphy's offer for the user to receive $2 off any size pizza at regular price. Similarly, the content ranking metrics of ratings vector 2 may correspond to user selections regarding the offer 218 of FIG. 2A regarding LA Fitness's offer for the user to receive a complementary two week pass for the user to use an exercise or workout facility. Finally, the content ranking metrics of ratings vector 3 may correspond to user selections regarding the offer 220 of FIG. 2A relating to Plato's Closet's offer for the user to receive a $5 off coupon when the user purchases of $35 or more of Plato's Closet retail products, which may include clothing, accessories, or other retail products, available at Plato's Closet stores, locations, online websites, etc.

FIGS. 6A-6C illustrate example embodiments of similarity pairing values 602-606 in accordance with the item-to-item recommender of FIG. 5. In the embodiments illustrated in FIGS. 6A-6C, the similarity pairing values 602-606 may be generated via similarity mappings between two of the ratings vectors, such as any two of the ratings vectors 1-3 (510-514) as described for FIG. 5 herein. In some embodiments, the similarity pairing values 602-606 may be generated from a similarity mapping (e.g., a cosine similarity, an adjusted cosine similarity, a Pearson correlation, Jaccard similarity coefficient, or other similar similarity mapping) between a set of ratings vectors. For example, as shown in FIG. 6A, the example 1 similarity pairing value 602 (e.g., the value "0") may be generated based on a similarity mapping (e.g., sim( . . . )) between ratings vector 1 (for offer 1) and ratings vector 2 (for offer 2). The ratings vector 1 includes content ranking metrics { 1,0, 1, NaN} and the ratings vector 2 includes content ranking metrics {0,1, NaN, 1}. While each of the ratings vectors 1 and 2 include additional content ranking metrics, those content ranking metrics that would result in a similarity pairing value being computed from a "NaN" value are removed. For example, if a pairing of content ranking metrics across two ratings vectors would involve at least one of the content ranking metrics being a NaN value, then that pair of content ranking metrics is ignored or skipped in generating the related similarity pairing value (e.g., as indicated in each of FIGS. 6A-6C, "ignoring/skipping pairs with NaN values"). For example, for the similarity pairing value 602, ratings vector 1 includes NaN for user 4 and ratings vector 2 includes NaN for user 3. Accordingly, the content ranking metric pairs for both user 3 and user 4 are ignored or skipped in the generation of the similarity pairing value 602 such that content ranking metric pairings considered across ratings vectors 1 and 2 becomes {1,0} for ratings vector 1 and {0,1} for ratings vector 2. Similar determinations are made for each of the similarity pairing values 604 and 606. Ignoring or skipping pairing of content ranking metrics with NaN values allows the recommender system to avoid violating the item-to-item collaborative filtering of the item-to-item recommender.

Similarly, as shown in FIG. 6B, the example 2 similarity pairing value 604 (e.g., the value "1") may be generated based on a similarity mapping (e.g., sim( . . . )) between ratings vector 1 (for offer 1) and ratings vector 3 (for offer 3). Accordingly, the ratings vector 1 includes content ranking metrics {0,1} and the ratings vector 3 includes content ranking metrics {0,1}, which represent the pairings of content ranking metrics across ratings vectors 1 and 3 that do not have NaN values.

Finally, as shown in FIG. 6C, the example 3 similarity pairing value 606 (e.g., the value "0") may be generated based on a similarity mapping (e.g., sim( . . . )) between ratings vector 2 (for offer 2) and ratings vector 3 (for offer 3). The ratings vector 2 includes content ranking metrics {1,1} and the ratings vector 3 includes content ranking metrics {0,0}, which represent the pairings of content ranking metrics across ratings vectors 2 and 3 that do not have NaN values.

Figure 7:
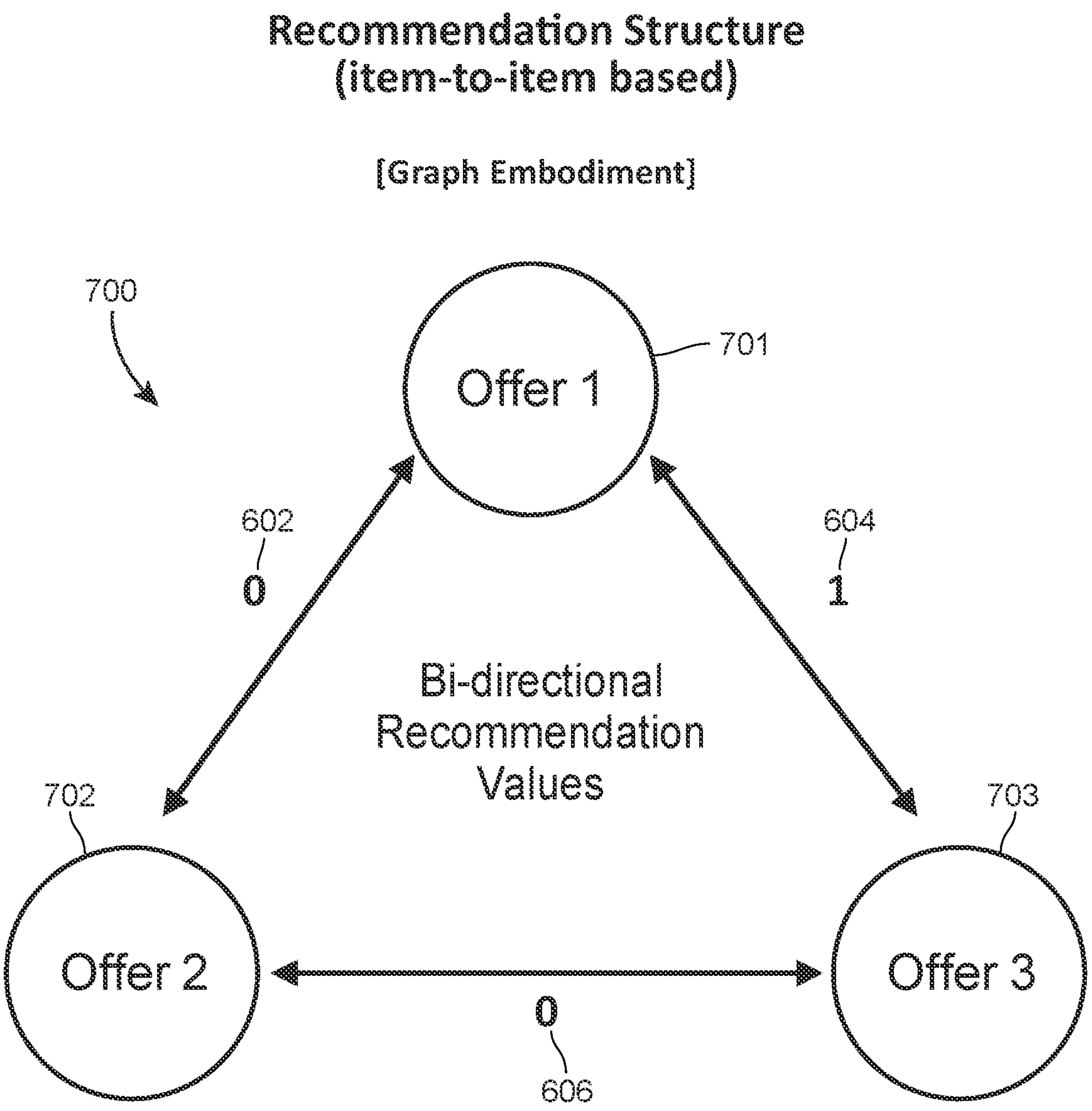
FIG. 7 illustrates a graph embodiment of an item-to-item based recommendation structure generated from the similarity pairing values of FIGS. 6A-6C.

FIG. 7 illustrates a graph embodiment of an item-to-item based recommendation structure 700 generated from the similarity pairing values of FIGS. 6A-6C. The bi-directional graph may be an electronic, navigable graph that is represented as a multi-linked list of one or more data objects 701-703 (e.g., that correspond to items or offers, for example, offers 1-3 as described for FIG. 5) in one or more memories, such as one or more memories of the recommender server(s) 102. The recommendation structure 700 is bi-directional because each of the data objects 701-703 share a similarity pairing values (e.g., any of 602-606 of FIG. 6) such that access to one of the two data objects provides access, e.g., via the multi-link list, to shared similarity pairing values (e.g., any of 602-606). For example, as shown in the embodiment of FIG. 7, data object 701 (for offer 1) and data object 702 (for offer 2) are linked in the computer memory, such as via a memory pointer. Each of data objects 701 and 702 have further links and access to similarity pairing value 602, such as additional, respective pointers from the data objects 701 and 702 to the similarity pairing value 602. Accordingly, by accessing either of data objects 701 or 702, the recommender server(s) 102 may access similarity pairing value 602. The same functionality would apply with respect to the other pairs of data objects and their respective similarity pairing values, including for the offer 1 701/offer 3 703 data object pair (with similarity pairing value 604), and for the offer 2 702/offer 3 703 data object pair (with similarity pairing value 606).

As described herein, the recommender server(s) may access the data objects 701-703 and similarity pairing value 602-606 of the item-to-item based recommendation structure 700 via one or more bi-directional lookup interfaces. For example, the graph-based, item-to-item based recommendation structure 700 may include an interface, such as a bi-directional look-up interface for accessing each the data objects and their respective similarity pairing value. In some embodiments, the bi-directional look-up interface is implemented as an API associated with one or more programming language(s), such as Python, Java, C#, etc. In such embodiments, the recommender server(s) may access the recommendation structure 700 by invoking the API directly, such as via a function call. In other embodiments, the bi-directional look-up interface is implemented as programming language agnostic interface, such as a RESTful API. In such embodiments, the RESTful API can provide responses to remote requests, such as responses to requests from remote client devices (e.g., client devices 120), where the RESTful API is hosted and exposed via a server, such as recommender server(s) 102.

The recommender server(s) may use the bi-directional lookup interface of the item-to-item based recommendation structure 700 to determine and return bi-directional recommendation values. For example, a lookup request, such as a local function, or RESTful network, API call may be submitted to the bi-directional lookup interface which would cause the recommender server(s) 102 to use the similarity pairing values 602-606 to generate the return bi-directional recommendation value as described herein. The lookup request may include a request for one of the two items (e.g., one of two offers, for example, offer 1 or offer 2), and, given that the recommendation structure 700 is bi-directional, the recommender server(s) 102 would be able to access the appropriate similarity pairing value (e.g., similarity pairing value 602) for determination of the related bi-directional recommendation value as described herein. The bi-directional recommendation values may include, point to (in memory), or otherwise indicate that a likelihood of a user selecting a particular item or offer. In this way the recommender server(s) 102 can provide a prediction of particular user(s) likelihood of liking or selecting particular items or offers.

As described herein, the recommender server(s) 102 may generate and update, in an iterative manner, the recommendation structures, such as the item-to-item based recommendation structure 700 on a periodic basis, e.g., every second, minute, hour, day, week, etc. For example, in some embodiments the recommender server(s) 102 may generate the recommendation 700 structure as part of a batch process, where the batch process generates the recommendation structure 700 based on the most recent content ranking metrics currently available to the recommender server(s) 102.

In some embodiments the item-to-item based recommendation structure 700 may be "picklable," i.e., able to serialized into a file or other data structure. The pickled recommendation structure may then be stored (e.g., in one or more memories of recommender server(s) 102) where it can be later accessed and used to provide bi-directional recommendation values as described herein.

The graph-based item-to-item based recommendation structure 700 provides various benefits to the recommender system. For example, because the graph is bi-directional and its values may be predetermined, the overall lookup time may be extremely quick, for example, in near-constant time. In addition, the overall structure can be simplified (as compared to a non-bi-directional graph), where the bi-directional graph recommendation structure 700 takes up less space in memory, because it stores a single similarity pairing value (e.g., similarity pairing value 702) for two items (e.g., offer 1 and offer 2), instead of storing two separate values for each of the two items. The smaller size also allows the bi-directional graph recommendation structure 700 to be transmitted more efficiently across a computer network.

FIG. 8 illustrates a dictionary embodiment of an item-to-item based recommendation structure 800 generated from the similarity pairing values of FIGS. 6A-6C. The item-to-item based recommendation structure 800 includes and provides the same features and functionality as described for FIG. 7, but is instead implemented in a dictionary form. For example, the recommendation structure 800 may be implemented as a dictionary object in one or more memories of the recommender server(s) 102. Instead of linking the associations between the offers 1-3 and their respective similarity pairing values as shown for the graphed-based embodiment of FIG. 7, the dictionary-based embodiment of the recommendation structure 800 uses bi-directional key values 802 that are associated with, and that may be used to lookup, respective similarity pairing values 804. For example, in the embodiment of FIG. 8, the bi-directional key value offer1-2 may be used to look up and access the similarity pairing value 602 of FIG. 6A. Similarly, the bi-directional key values offer1-3 and offer2-3 may be used to look up and access the similarity pairing values 604 and 606 of FIGS. 6B and 6C, respectively.

In some embodiments, as shown for FIGS. 6A-C, 7, and 8, the similarity pairing values may include 1 or 0 values. In other embodiments, however, the similarity pairing values may be continuous and have, for example, scalar, decimal, or percentage values that range from 0.0 to 1.0, such as 0.25, 0.50, 0.75, etc.

Figure 9:
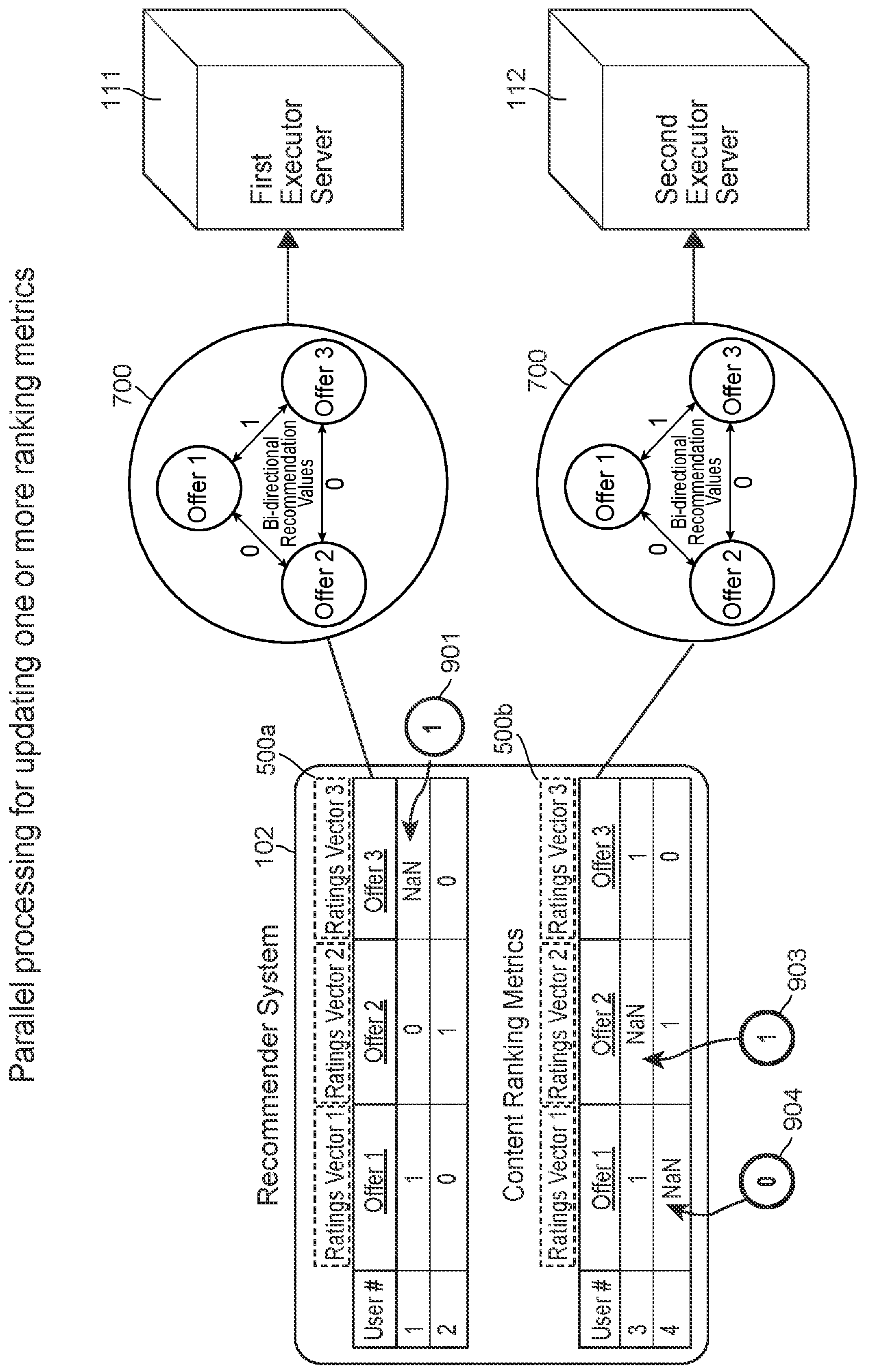
FIG. 9 illustrates a parallel processing embodiment for updating one or more content ranking metrics of FIG. 5 using the recommendation structure of FIG. 7.

FIG. 9 illustrates a parallel processing embodiment for updating one or more content ranking metrics of FIG. 5 using the recommendation structure 700 of FIG. 7. In the embodiment of FIG. 9, the rows of content ranking metrics of respective users of recommender 500 of FIG. 5 have been split into two subsets. As shown in FIG. 9, this incudes recommender subset 500*a* (including the rows of content raking metrics for users 1 and 2) and recommender subset 500*b* (including the rows of content raking metrics for users 3 and 4). As shown, the recommender subsets 500*a* and 500*b* may each be transmitted, via the computer network 130, to a second set of processors, such as the second set of processors of separate executor servers 111 and 112, together with a copy of, or link to, the recommendation structure 700 of FIG. 7. Each of the executor servers 111 and 112 may operate, independently, using the recommendation structure 700 to update any content ranking metrics having NaN values in the recommendation structure subsets (500*a* and 500*b*) with new bi-directional recommendation values as determined and generated from the similarity pairing values.

For example, as depicted for FIG. 9, the recommendation structure subset 500*a* and a copy of, or link to, a recommendation structure 700 may be transmitted, via computer network 130, to first executor server 111. First executor server 111 may then update the user ranking metric for offer 3 of user 1 by accessing and using the similarity pairing values from the bi-directional look-up interface of recommendation structure 700 to generate a new bi-directional recommendation value 901 for offer 3 for user 1. The new bi-directional recommendation value 901 may be used to update the content ranking metric value. The new bi-directional recommendation value 901 may be generated by applying a weighted sum determination to the user's content ranking metrics and related similarity pairing values for the user's known selections (e.g., offers 1 and 2 for user 1). For example, an embodiment of a weighted sum determination that may be used to generate the bi-directional recommendation value 901 is indicated below:

$$birv_{ux,ij} = \bar{r}_{ux} + \left(\sum_{k \notin J_x} ((r_{ux,ik} - \bar{r}_{ux}) sim(i_k, i_j))\right) \Big/ \sqrt{\sum_{k \notin J_x} sim(i_k, i_j)},$$

where:

- $birv_{ux,ij}$: bi-directional recommendation value for user x using user x's known, ranked items i (e.g. offers)
- $\bar{r}_{ux}$: mean user x rating of user's ranked items (e.g. offers) (different users rate on different scales)
- $J_x$: subset of unrated (NaN) items or offers for user x
- $r_{ux,ik}$: user x's rating of item k (e.g. offer k)
- $sim(i_k,i_j)$: a similarity pairing value between item k (e.g. offer k) and item j (e.g. offer j)

The new bi-directional recommendation value 901 may indicate a likelihood that user 1 would select offer 3. In the embodiment of FIG. 9, because the new bi-directional recommendation value 901 is "1," the user would likely choose to select (e.g., to clip) offer 3 if presented to the user. In some embodiments, as shown for FIGS. 5 and 9, the recommender 500 may be constrained to 1 or 0 value such that only Boolean type values may be determined by the executor servers. In other embodiments, however, scalar values, continuous values, decimal values, or percentage values indicating a degree of likelihood may be generated for the new bi-directional recommendation values.

Updating the content ranking metric for offer 3 of user 1 with the new bi-directional recommendation value 901 may cause the recommender server(s) 102 generate an updated recommendation structure 500 with an updated bi-directional look-up interface, where the similarity pairing values are newly updated based on ratings vector 3 being newly updated with the new recommendation value 901. In some embodiments, the updated recommendation structure 500 may be generated by the executor server 111. In other embodiments, the executor server 111 may send the new recommendation value 901 back to the recommender server(s) 102, where the recommender server(s) 102 update the recommendation structure 500 with the new recommendation value 901 and that causes generation of the newly updated recommendation structure 500. The generation of the newly updated recommendation structure 500 and/or related bi-directional look-up interface may cause the recommender server(s) 102 to transmit offer 3 to user 1. User 1 may select the offer 3 (e.g. select to clip offer 3) as described herein, which may cause the recommender server(s) 102 to update the recommendation structure again.

Similarly, with respect to recommendation structure subset 500*b*, recommendation structure 700 may be transmitted, via computer network 130, to second executor server 112. Second executor server 112 may then update the user ranking metric for offer 2 of user 3, and offer 1 of user 4, by accessing and using the similarity pairing values from the bi-directional look-up interface of recommendation structure 700 to generate a new bi-directional recommendation values 903 and 904 for offer 2 of user 3, and offer 1 of user 4, respectively. The new bi-directional recommendation values 903 and 904 may be generated by applying a weighted sum determination to the respective user's content ranking metrics and related similarity pairing values for the respective user's known selections (e.g., offers 1 and 3 of user 3, and offers 2 and 3 of user 4). The new bi-directional recommendation values 903 and 904 may indicate a likelihood that user 3 and 4 would select offers 2 and 1, respectively. As shown in FIG. 9, because the new bi-directional recommendation value 903 is "1," user 3 would likely choose to select (e.g., choose to clip) offer 2. Similarly, because the new bi-directional recommendation value 904 is "0," user 4 would not likely choose to select (e.g., choose to clip) offer 1.

As described for offer 3 of user 1, updating the content ranking metric for offers 2 and 1 of users 3 and 4, respectively, with the new bi-directional recommendation values 903 and 904 may cause the recommender server(s) 102 to generate an updated recommendation structure 500 with an updated bi-directional look-up interface, where the similarity pairing values are newly updated based on the ratings vectors (e.g., ratings vectors 1 and 2) being newly updated with the new recommendation values 903 and 904. In some embodiments, the updated recommendation structure 500 may be generated by the second executor server 112. In other embodiments, the second executor server 112 may send the new recommendation values 903 and 904 back to the recommender server(s) 102, where the recommender server(s) 102 update the recommendation structure 500 with the new recommendation values 903 and 904, and then generate the newly updated recommendation structure 500. The generation of the updated recommendation structure 500 and/or related bi-directional look-up interface may cause the recommender server(s) 102 to transmit offer 2 to user 3, but not transmit offer 1 to user 4 (because the new recommendation value is "0" for offer 1 of user 4). The user 3 may select the offer 2 (e.g. select to clip offer 2) as described herein.

While FIG. 9 describes an embodiment for updating one or more content ranking metrics with new recommendation values using parallel processing, in other embodiments, the content ranking metrics may be updated by a single server or processor, and without splitting the recommendation structure 500 into subsets or transmitting such subsets to executor servers. For example, in alternate embodiments, the one or more of the recommender server(s) 102 may update the content ranking metrics with bi-directional recommendation values without sending the separate subsets of content ranking metrics from item-to-item recommender 500 to the different executor servers 111 and 112 as described for FIG. 9.

Figure 10:
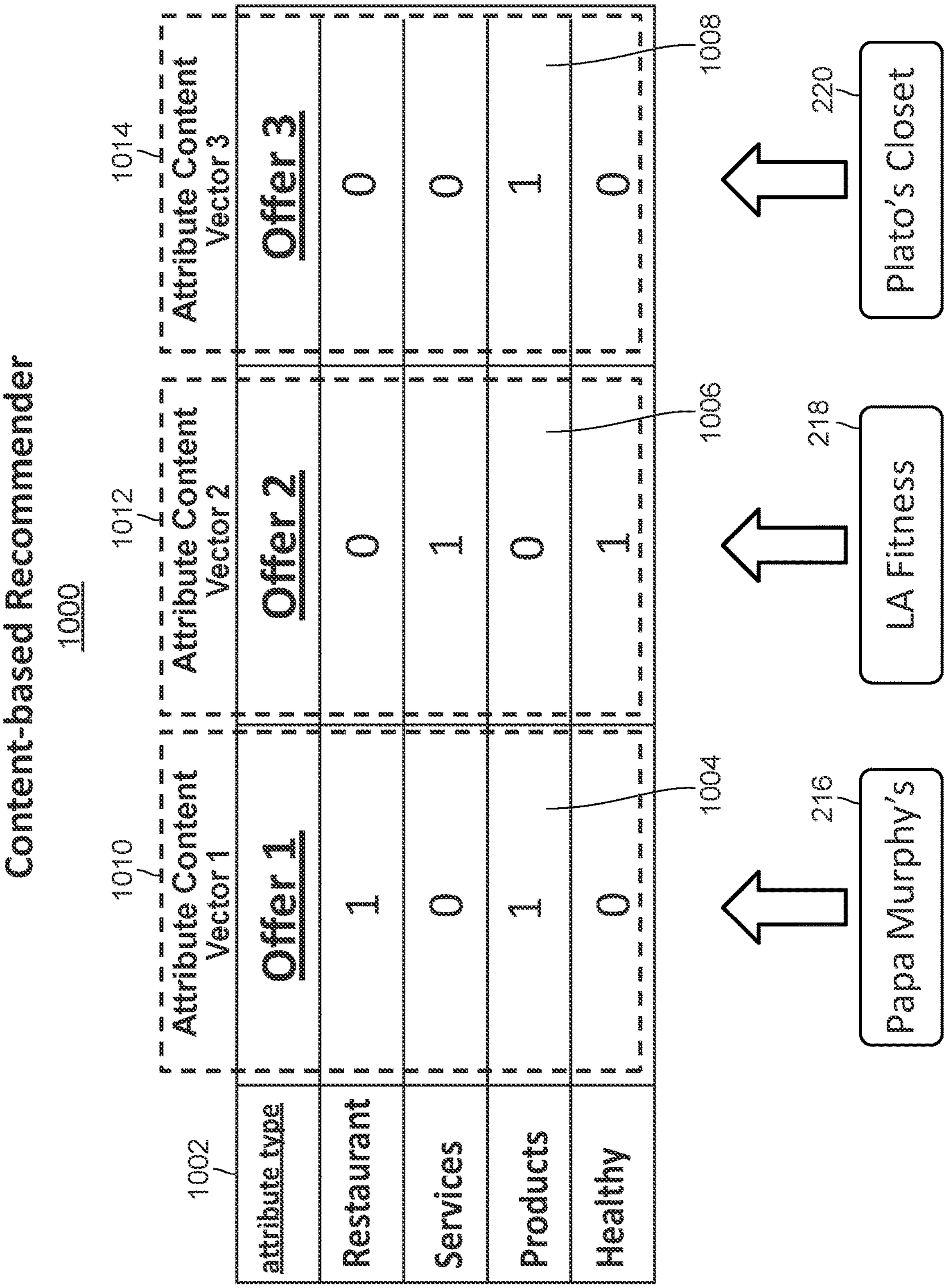
FIG. 10 illustrates an embodiment of a content-based recommender of the recommender system of FIG. 1 that includes one or more content attribute types and a plurality of attribute content vectors containing content attribute values.

FIG. 10 illustrates an embodiment of a content-based recommender 1000 of the recommender server(s) 102 of FIG. 1 that includes one or more content attribute types 1002 and a plurality of attribute content vectors 1010-1014 containing content attribute values. In some embodiments, the content-based recommender 1000 may be a data structure or a data object in on one or memories of the recommender server(s) 102, such as a database. The content-based recommender 1000 of FIG. 10 provides a hybrid approach of bootstrapping recommendations in "cold start" situations, such as where an item-to-item based recommender (e.g., item-to-item recommender 500 of FIG. 5) includes NaN values for most (or all) of its content ranking metrics, and, therefore prevents the generation of similarity pairing values, and, thus, bi-directional recommendation values as described herein. This may happen in circumstances where the item-to-item based recommender 500 has no corresponding content ranking metrics across one or more pairs of ratings vectors such that no similarity pairing values (e.g., similarity pairing values 6A-6C) could be generated from any ratings vectors in the first instance. For example, if the complete ratings vector 1 of FIG. 6A for users 1-4, respectively, was changed to {1,NaN,1,NaN}, and if the complete ratings vector 2 of FIG. 6B for users 1-4, respectively, was changed to {NaN,1,NaN,0}, then there would be no pairs of content ranking across the changed ratings vectors 1 and 2 to compute similarity pairing values as described herein. Accordingly, a cold start may be experienced in embodiments where most (but not all) of the content ranking metrics of the item-to-item based recommender 500 are NaN values, such that no similarity pairing value can be generated because there are too few content ranking metrics available. The cold start issue could also arise if the item-to-item based recommender 500 had all NaN values for the content ranking metrics of all users (e.g., which could represent a cold start of the system where no user had ranked any of the vector types).

In such instances where the item-to-item based recommender (e.g., recommender 500) experiences cold start issues, then a content-based recommender, such as the content-based recommender 1000 embodiment, can determine similarity based on a catalogue of content attributes types. For example, in the embodiment of FIG. 10, content-based recommender 1000 includes a catalogue of content attribute types 1002, which includes each of Restaurant, Services, Products, Healthy. Each attribute type of content-based recommender 1000 may be associated with an attribute of the vector type, where, for the embodiment of FIG. 10 is offers 1-3 (offer 1, offer 2, offer 3) that correspond to offers 216-220 (Papa Murphy's 216, LA Fitness 218, and Plato's Closet 220), respectively, and as described for FIGS. 2B and 5. In the embodiment of FIG. 10, offers 1-3 are associated with merchant offers 216-220. Accordingly, content-based recommender 1000 includes content attribute types 1002 associated with merchant offers, including whether each of merchant offers (offers 1-3) relate to, or are associated with, Restaurant-type offers, Services-type offers, Products-type offers, and/or Healthy-type offers. Such content attribute types may have been determined based on how they define each of the offers and their relevance in predicting how users tend to correlate, associate, or otherwise like offers with similar attributes or features.

The content-based recommender 1000 includes content attribute values that have been determined for each of the offers (e.g., 216-220) and for each of the content attribute types. For example, for the Products attribute type, offer 1 (e.g. 216, the pizza-related offer from Papa Murphy's), the content attribute value 1004 is "1" indicating that offer 1 is associated with a product (e.g., Pizza). In contrast, for the Products attribute type, offer 2 (e.g. 218, the exercise-related offer from LA Fitness's), the content attribute value 1006 is "0" indicating that offer 2 is associated with a service (e.g., exercise or work out services). Finally, for the Products attribute type, offer 3 (e.g. 220, the clothes-related offer from Plato's Closet), the content attribute value 1008 is "1" indicating that offer 2 is associated with a product (e.g., clothes or accessories). The content attribute values may be determined by the recommender server(s) using a machine-based technique, such as via machine-learning, and/or may be determined and assigned by an administrator, etc. of the recommender server(s) 102 (e.g., using local client device 104 or remote client device 106).

The content-based recommender 1000 may further include attribute content vectors, which for the embodiment of FIG. 10, are depicted as columns of the content attribute values for the specific vector type, e.g., merchant offers (e.g., offers 1-3). Accordingly, the ratings vector 1 1010 includes the content attribute values for offer 1, which include values {1,0,1,0}. Similarly, the ratings vector 2 1012 includes the content attribute values for offer 2, which include values {0,1,0,1}. Finally, the ratings vector 3 1014 includes the content attribute values for offer 3, which include values {0,0,1,0}. Accordingly, the content-based recommender 1000 does not have any NaN values, and thus may be utilized in instances of cold start situations as described herein. For example, in instances where a similarity pairing value cannot be generated from an item-to-item based recommender because of too many NaN values, then such similarity pairing values may be generated instead based on the content attribute types, content attribute values, and attribute content vectors of the content-based recommender 1000. For example, in such situations, a first ratings vector could be attribute content vector 1 1010 with its first set of content attribute values, and a second ratings vector could be attribute content vector 2 1012 with its second set of content attribute values. As described for FIGS. 11A-11C, the similarity pairing value can be generated from attribute content vector 1 1010 and attribute content vector 2 1012, which in turn may be used to generate bi-directional recommendation values as described herein.

In this way the content-based recommender 1000 provides the recommender server(s) 102 a way to bootstrap, or cold start, an item-to-item based recommender, where the content-based recommender may be used to generate initial similarity pairing values. The content-based recommender provides the benefits of not being constrained or limited by NaN values, and, therefore, it is able to inject flexibility to bootstrapping the recommender server(s).

FIGS. 11A-11C illustrates example embodiments of content-based similarity pairing values in accordance with the content-based recommender 1000 of FIG. 10. The content-based similarity pairing values 1102-1106 of FIGS. 11A-11C may be determined in the same manner as described for the similarity pairing values, however, the embodiments of FIGS. 11A-11C provide examples of similarity pairing values in accordance with content-based recommender 1000.

In the embodiments illustrated in FIGS. 11A-11C, the similarity pairing values 1102-1106 may be generated via similarity mappings between two of attribute content vectors, such as any two of the attribute content vectors 1-3 (1010-1014) as described for FIG. 10 herein. For example, as shown in FIG. 11A the example 1 content-based similarity pairing value 1102 (e.g., the value "0") may be generated based on a similarity mapping (e.g., sim( . . . )) between attribute content vector 1 1010 (for offer 1) and attribute content vector 2 1012 (for offer 2). The attribute content vector 1 1010 includes content attribute values {1,0,1,0} and the attribute content vector 2 1012 includes content attribute values {0,1,0,1}. Because the content-based recommender 1000 includes no NaN values (as is typical, but not necessary, for content-based recommenders), there is no need, at least in the embodiment using content-based recommender 1000, to skip or ignore any content attribute value pairs in the generation of content-based similarity pairing value 1102.

Similarly, as shown in FIG. 11B, the example 2 content-based similarity pairing value 1104 (e.g., the value "0.7071") may be generated based on a similarity mapping (e.g., sim( . . . )) between attribute content vector 1 1010 (for offer 1) and ratings vector 3 1014 (for offer 3). Accordingly, the attribute content vector 1 1010 includes content attribute values {1,0,1,0} and the attribute content vector 3 1014 includes content attribute values {0,0,1,0}, which represent the pairs of attribute content values across ratings vectors 1 and 3 that do not have NaN values.

Finally, as shown in FIG. 11C, the example 3 content-based similarity pairing value 1106 (e.g., the value "0") may be generated based on a similarity mapping (e.g., sim( . . . )) between attribute content vector 2 1012 (for offer 2) and attribute content vector 3 1014 (for offer 3). The attribute content vector 2 1012 includes content attribute values {0,1,0,1} and the attribute content vector 3 1014 includes content attribute values {0,0,1,0}, which represent the pairs of content attribute values across attribute content vectors 2 and 3 that do not have NaN values.

Figure 12:
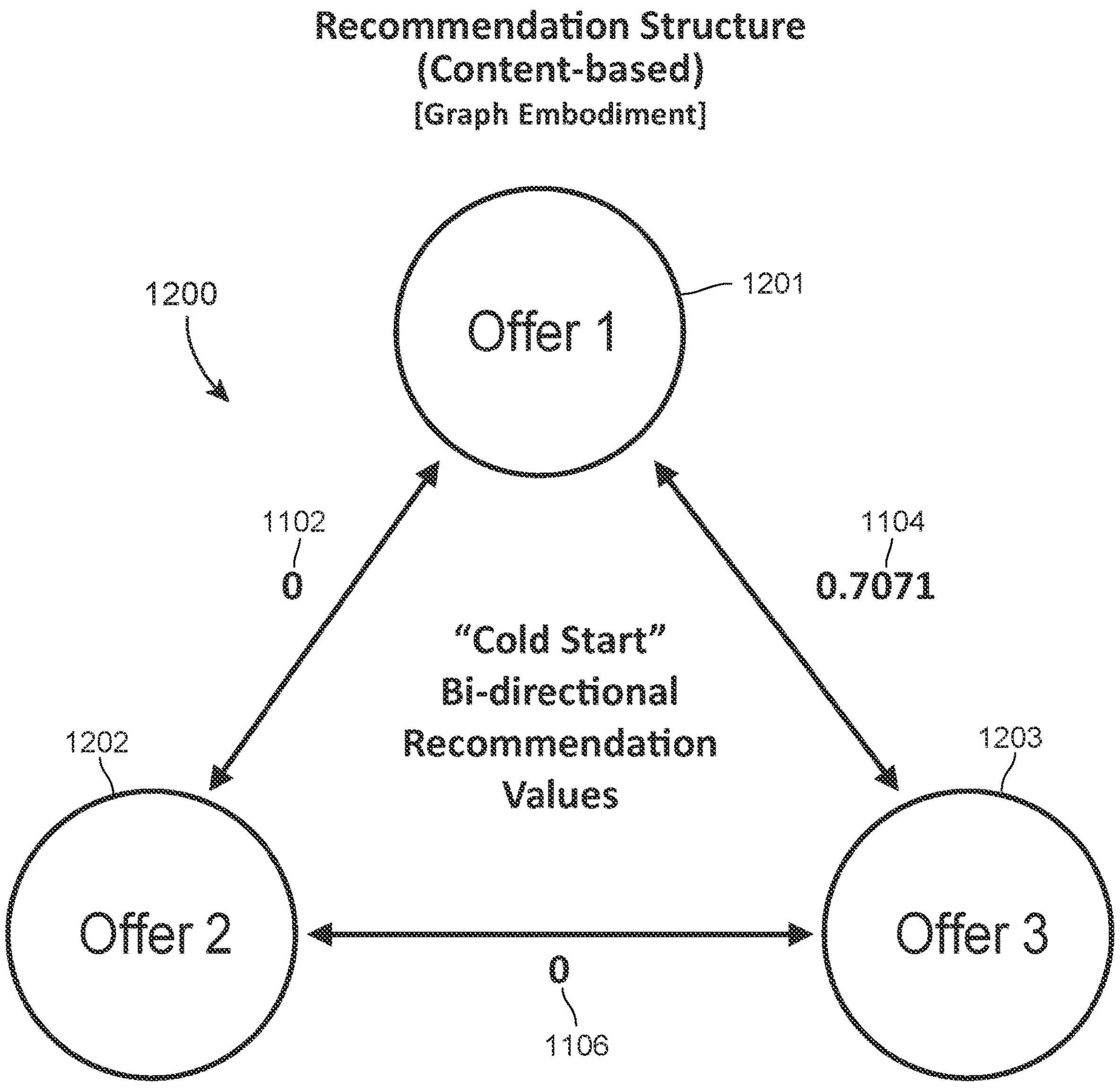
FIG. 12 illustrates a graph embodiment of a content-based recommendation structure generated from the content-based similarity pairing values of FIGS. 11A-11C.

FIG. 12 illustrates a graph embodiment of a content-based recommendation structure 1200 generated from the content-based similarity pairing values 1102-1106 of FIGS. 11A-11C. The graph-based recommendation structure 1200 is similar to that of the graph-based recommendation structure 700, but instead uses the similarity pairing values 1102-1106 instead of 700-706. The graph-based recommendation structure 1200 may be used in, or substituted for, embodiments herein as described for recommendation structure 700. The content-based recommendation structure 1200 provides the same or similar benefits to the recommender systems and methods as described herein for recommendation structure 700.

For example bi-directional graph of recommendation structure 1200 may be an electronic, navigable graph that is represented as a multi-linked list of one or more data objects 1201-1203 (e.g., that correspond to items or offers, for example, offers 1-3 as described for FIG. 10) in one or more memories, such as one or more memories of the recommender server(s) 102. The recommendation structure 1200 is bi-directional because each of the data objects 1201-1203 share similarity pairing values (e.g., any of 1102-1106 of FIG. 11) such that access to one of the two data objects provides access, e.g., via the multi-linked list, to shared similarity pairing values (e.g., any of 1102-1106). For example, as shown in the embodiment of FIG. 12, data object 1201 (for offer 1) and data object 1202 (for offer 2) are linked in the computer memory, such as via a memory pointer. Each of data objects 1201 and 1202 have further links and access to similarity pairing value 1102, such as additional, respective pointers from the data objects 1201 and 1202 to the similarity pairing value 1102. By accessing either of data objects 1201 or 1202, the recommender server(s) 102 may access similarity pairing value 1102. The same functionality would apply with respect to the other pairs of data objects and their respective similarity pairing values, including for the offer 1 1201, offer 3 1203 data object pair (with similarity pairing value 1104), and for the offer 2 1202, offer 3 1203 data object pair (with similarity pairing value 1106).

The recommender server(s) 102 may access the data objects 1201-1203 and similarity pairing value 1102-1106 of the content-based recommendation structure 1200 via one or more bi-directional lookup interfaces in the same manner as described herein for item-to-item based recommendation structure 700. For example, the recommender server(s) 102 may use the bi-directional lookup interface of the content based recommendation structure 1200 to determine and return bi-directional recommendation values. For example, a lookup request, such as a function or API call, may be submitted to the bi-directional lookup interface which would cause the recommender server(s) 102 to use the similarity pairing values 1102-1106 to generate the return bi-directional recommendation values as described herein. The lookup request may include a request for one of the two items (e.g., one of two offers, for example, offer 1 or offer 2), and, given that the recommendation structure 1200 is bi-directional, the recommender server(s) 102 would be able to access the appropriate similarity pairing value (e.g., similarity pairing value 1102) for determining bi-directional recommendation values as described herein. The related bi-directional recommendation values may include, point to (in memory), or otherwise indicate that a likelihood of a user selecting a particular item or offer. In this way the recommender server(s) 102 can provide a prediction of particular user(s) likelihood of liking or selecting particular items or offers.

In some embodiments the content-based recommendation structure 1200 may be "picklable," i.e., able to serialized into a file or other data structure. The pickled recommendation structure 1200 may then be stored (e.g., in one or more memories of recommender server(s) 102) where it can be later accessed and used to provide bi-directional recommendation values as described herein.

Figure 13:
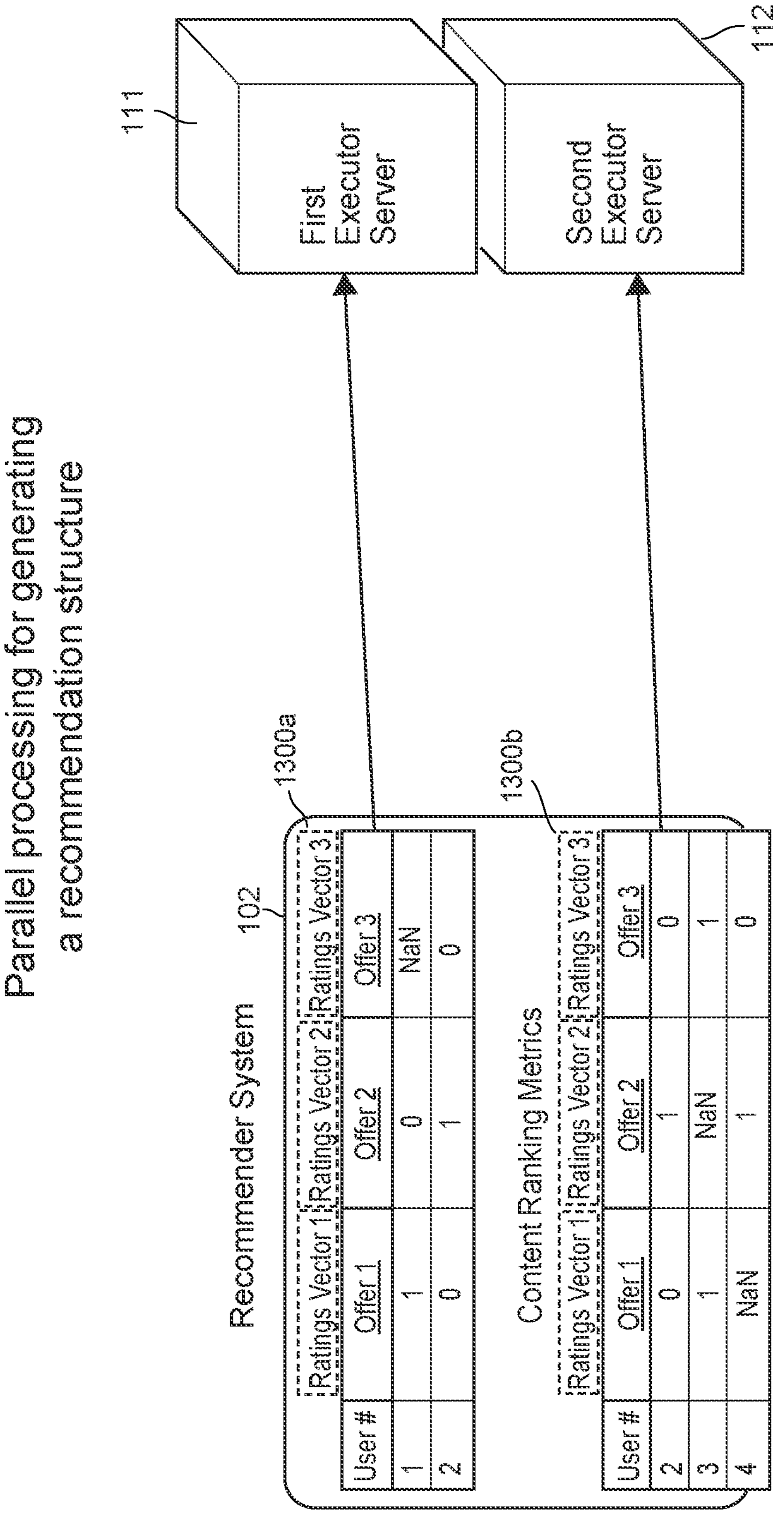
FIG. 13 illustrates a parallel processing embodiment for generating the item-to-item based recommendation structure of FIG. 5.
Figure 15:
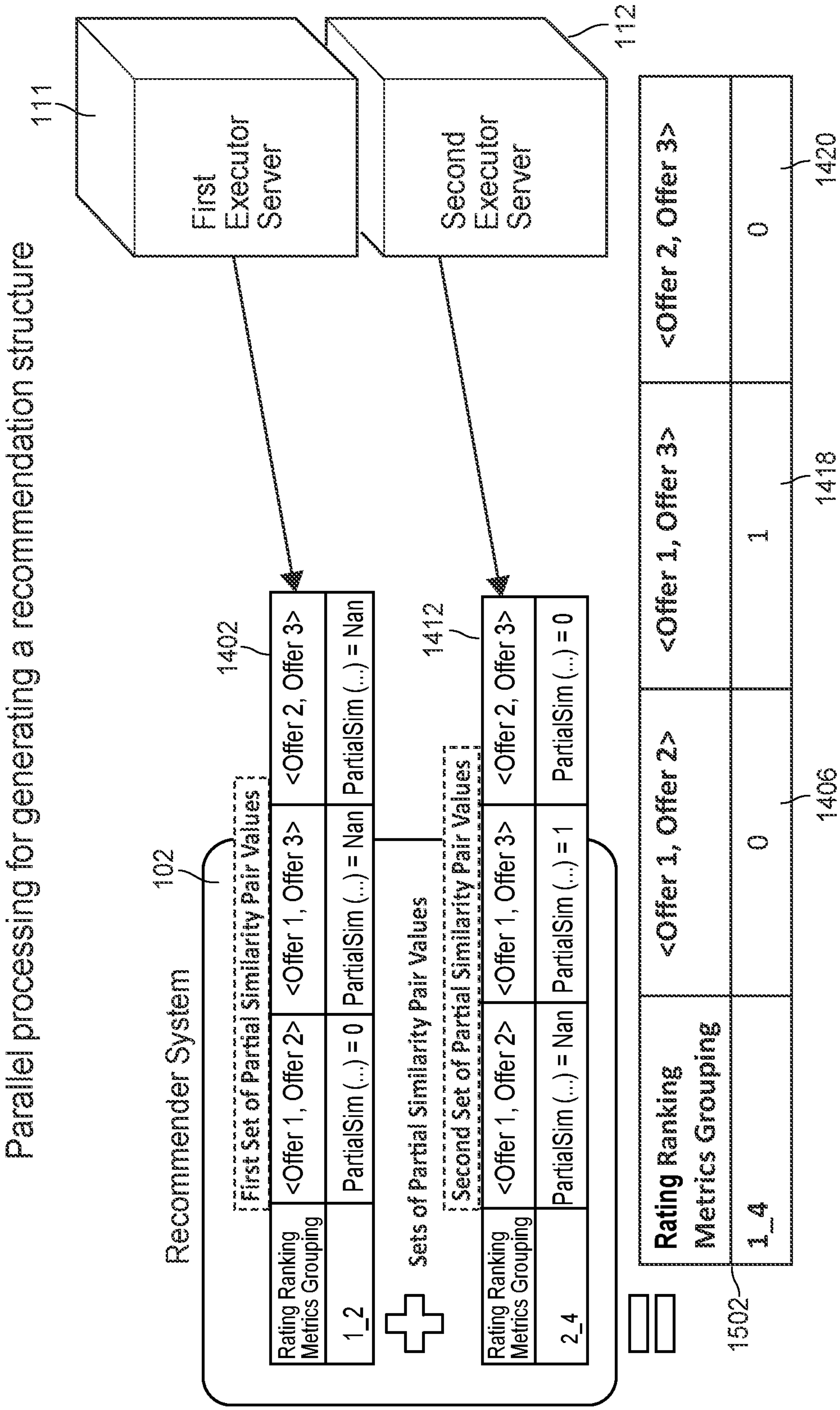
FIG. 15 illustrates an embodiment of a recommendation structure generated based on merging the sets of partial similarity pairing values of FIG. 14.

In the embodiments of FIGS. 13-15, the recommendation structure 500 is generated via parallel processing. For example, FIG. 13 illustrates a parallel processing embodiment for generating the item-to-item based recommendation structure 500 of FIG. 5. In the embodiment of FIG. 13, the rows of content ranking metrics of respective users of recommender 500 of FIG. 5 have been split into two subsets. As shown in FIG. 13, this includes recommender subset 1300*a* (including the rows of content ranking metrics for users 1 and 2) and recommender subset 1300*b* (including the rows of content ranking metrics for users 2-4). The content ranking metrics across the subsets need not be mutually exclusive. As shown, the recommender subsets 1300*a* and 1300*b* may each be transmitted from the recommender server(s) 102, via the computer network 130, to a second set of processors, such as the second set of processors of separate executor servers 111 and 112. Each of the executor servers 111 and 112 may operate, independently, to generate sets of partial similarity pairing values based on the recommendation structure subsets 1300*a* and 1300*b*, respectively. While FIG. 13 describes an embodiment for generating recommendation structure 500 using parallel processing, in other embodiments, the recommendation structure 500 may be generated by a single server or processor, and without splitting the recommendation structure 500 into subsets or transmitting such subsets to executor servers. For example, in alternate embodiments, the one or more of the recommender server(s) 102 may generate the recommendation structure without sending the subsets of rows of content ranking metrics of respective users of recommender 500 to the different executor servers 111 and 112 as described for FIG. 9. In still further embodiments, the recommender server(s) 102 itself may use separate executors (e.g., executors 1 . . . n) executing on the one or more processors of recommender server(s) 102, where the separate executors would perform the same functionality as described herein for executor servers 111 and 112, but where the separate executors execute locally, on recommender server(s) 102.

For example, FIG. 14 illustrates embodiments of sets (1402 and 1412) of partial similarity pairing values generated during the parallel processing embodiment of FIG. 13. The sets 1402 and 1412 are examples of data structures that are represented in tabular format, although any in-memory data structure may be used, such as data structures transmitted by, stored in, and/or operated on in the memories of any of server(s) 102, 111, and/or 112. For example, the first set of partial similarly pairing values 1402 may include one or more rows of content ranking metrics groupings 1404. In the embodiment of FIG. 14, only one such row 1405 is shown for a grouping 1_2. Grouping 1_2 1405 includes a partial set of similarity pairing values 1406-1410 which are determined in the same or similar manner as described for FIGS. 6A-6C. The similarity pairing values of Grouping 1_2 1405 may be determined from similarity mappings between the ratings vectors and their available content ranking metrics. Because the recommender subset 1300*a* includes values for only users 1 and 2, then only content ranking metrics for those users may be used to a generate similarity pairing values, where each of the ratings vectors 1 to 3 are partial ratings vectors by virtue of having a partial set of content ranking metrics. For example, because the content ranking metric for user 1 at offer 3 includes a NaN value, and, as described herein for FIG. 6A, ratings vector 3 is ignored and not used to generate similarity pairing values. Accordingly, for the Grouping 1_2 1405, only the partial similarity pairing value 1406 may be computed by executor server 111 based on ratings vectors 1 and 2, where the partial similarity pairing value 1406 of FIG. 14 corresponds to similarity pairing value 602 of FIG. 6A. For the partial similarity pairing values that the executor server 111 cannot determine because of NaN values (e.g., 1408 and 1410), the executor server 111 may mark with NaN values, as shown in FIG. 14.

Similarly, the second set of partial similarly pairing values 1412 may include one or more rows of content ranking metrics groupings 1414. In the embodiment of FIG. 14, only one such row 1415 is shown for a grouping 2_4. Grouping 2_4 1415 includes a partial set of similarity pairing values 1416-1420 which are determined in the same or similar manner as described for FIGS. 6A-6C. The similarity pairing values of Grouping 2-4 1415 may be determined from similarity mappings between the ratings vectors and their available content ranking metrics. Because the recommender subset 1300*b* includes values for users 2 through 4, then only content ranking metrics for those users may be used to a generate similarity pairing values. For example, because the content ranking metrics for user 3 at offer 2, and content ranking metric for user 4 at offer 1, include a NaN values, and, as described herein for FIGS. 6B and 6C, those values are ignored and not used to generate similarity pairing values. Accordingly, for the Grouping 2_4 1415, the partial similarity pairing values 1418 and 1420 may be computed by executor server 112 based on ratings vectors 1-3, where the partial similarity pairing value 1418 of FIG. 14 corresponds to similarity pairing value 604 of FIG. 6B, and the partial similarity pairing value 1420 of FIG. 14 corresponds to similarity pairing value 606 of FIG. 6B. For the partial similarity pairing values that the executor server 112 cannot determine because of NaN values (e.g., 1416), the executor server 112 may mark with NaN values, as shown in FIG. 14.

FIG. 15 illustrates an embodiment of a recommendation structure generated based on merging the sets of partial similarity pairing values of FIG. 14. As shown in FIG. 15, executor server 111 returns to the recommender server(s) 102 the first set of partial similarity pairing values 1402, and the executor server 112 returns to the recommender server(s) 102 the second set of partial similarity pairing values 1412. As shown in FIG. 15, the recommender server(s) 102 may then merge the partial similarity pairing values 1402 and 1404 to generate an electronic recommendation structure 1502 that includes the similarity pairing values for all (or some) ratings vectors. In some embodiments, the merged recommendation structure 1502 may be implemented as a graph-based recommendation structure 700 or dictionary-based recommendation structure 800 as described for FIGS. 7 and 8, respectively. In some embodiments, the recommendation structure 1502 may be stored in one or more memories of any of the recommender server(s) 102, 111, and/or 112

Figure 16:
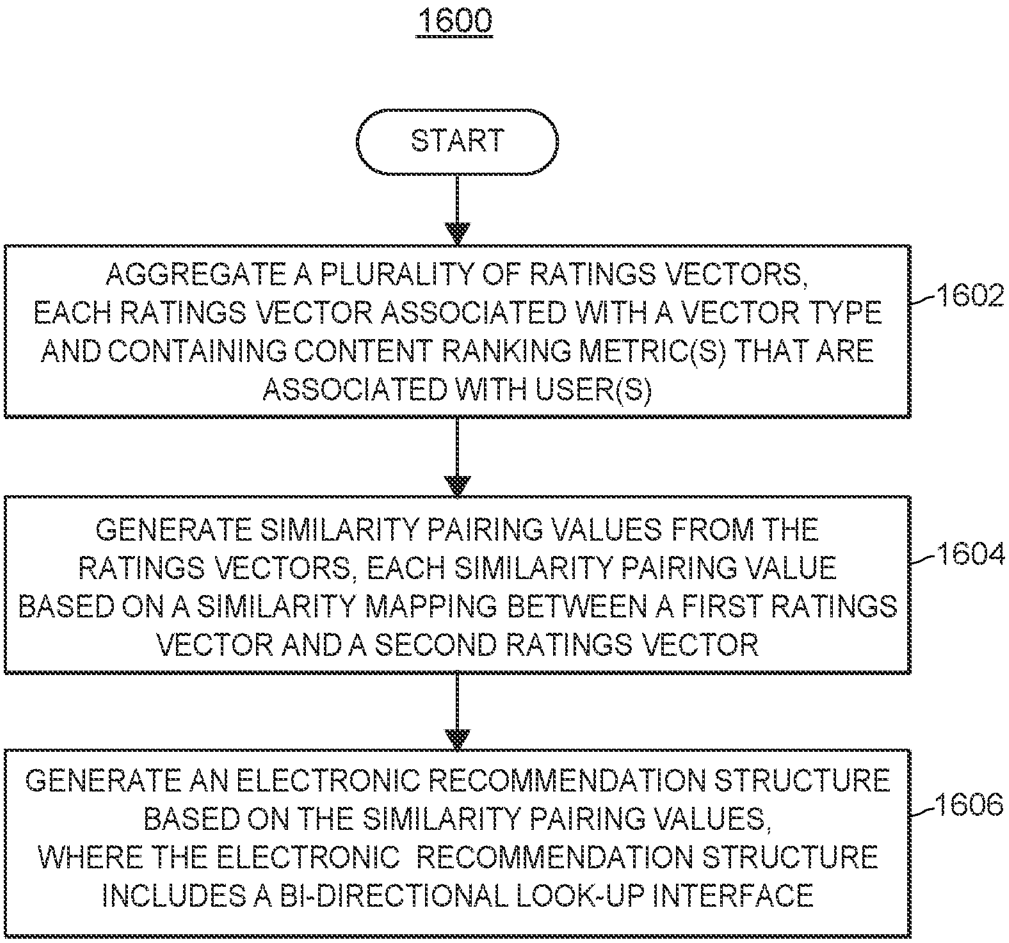
FIG. 16 illustrates a flow diagram of an exemplary method for generating efficient iterative electronic recommendation structures.

FIG. 16 illustrates a flow diagram of an exemplary method 1600 for generating efficient iterative electronic recommendation structures. Method 1600 begins at block 1602 where one or more processors and one or more memories, such as processor(s) and memory(s) of recommender server(s) 102, may be configured to aggregate a plurality of ratings vectors (e.g., ratings vectors 1-3 510-514 of FIG. 5). In some embodiments, the vector type may be an offer-based vector type and the content ranking metrics may be associated with user offers. For example, the ratings vectors may be ratings vectors 510-514 as described for FIG. 5. Each ratings vector may be associated with a vector type, for example, offers 1-3 of FIG. 5. In addition, each ratings vector may contain one or more content ranking metrics associated with one or more users, for example, users 1-4 of FIG. 5, which includes content ranking metrics 504-508 of user 3.

At block 1604, the recommender server(s) 102 may be further configured to generate similarity pairing values from the plurality of ratings vectors. The similarity pairing values may be the similarity pairing values 602-606 of FIGS. 6A-6C. Each similarity pairing value may be based on a similarity mapping between a first ratings vector and a second ratings vector. For example, the similarity pairing values may be generated from any of the ratings vectors 510-514 as described herein, where a first ratings vector may be ratings vector 1 510 and a second ratings vector may be ratings vector 2 512, that can together be used to generate the similarity pairing value 602 of FIG. 6A. As described herein, the similarity pairing values may be used to generate bi-directional recommendation values, such as the bi-directional recommendation values 901, 903, and 904 as described for FIG. 9.

At block 1606, the recommender server(s) 102 may be further configured to generate an electronic recommendation structure (e.g., which may be either a graph or a dictionary item-to-item based recommendation structure, such as described herein for recommendation structures 700 and 800 of FIGS. 7 and 8, respectively) based on the similarity pairing values. In some embodiments, the electronic recommendation structure may be generated on a periodic basis, which can include every second, minute, hour, day, week, etc. For example, the recommender server(s) 102 may execute a batch process, at specific times, that uses all available content ranking metrics at those times to generate new recommendation structures. In still further embodiments, the electronic recommendation structure (e.g., such as a recommendation structure 700 and 800) may be stored in one or more memories of the recommender server(s) 102. The similarity pairing values of the recommendation structure may be accessed with a bi-directional key value, such as the bi-directional key value described for the recommendation structure 800 of FIG. 8.

As described herein, the electronic recommendation structure (e.g., recommendations structure 700 and/or 800) may include a bi-directional look-up interface that is configured to return a bi-directional recommendation value after receiving a lookup request for either the vector type of the first ratings vector or the vector type of the second ratings vector (e.g., requests related to offers 1 or 2). For example, the recommendations structure 700 may receive a lookup request for either of the data object 701 (for offer 1) or data object 702 (for offer 2), and then return the related similarity pairing value (e.g., similarity pairing value 602). The similarity pairing value 602 may then be used by the recommender server(s) 102 to determine (e.g., via a weighted sum determination) the bi-directional recommendation value, as described herein. The bi-directional recommendation value may then be returned from the bi-directional look-up interface, and may be used, for example, to indicate a likelihood of a user selecting a given offer as described herein.

In some embodiments, a first ranking metric (e.g., 504 of FIG. 5) of the one or more content ranking metrics may be associated with a first user (e.g., user 3) and may correspond to a first offer (e.g., offer 1) associated with the first ratings vector (e.g., ratings vector 1 510). The first ranking metric (e.g., 504, with value "1" indicating a thumbs-up 210 selection) may indicate whether the first offer (e.g., offer 1) was selected by the first user (e.g., user 3). In other embodiments, a second ranking metric (e.g., 506) of the one or more content ranking metrics may also be associated with the first user (e.g., user 3) and may correspond to a second offer (e.g., offer 2) associated with the second ratings vector (e.g., ratings vector 2 512). The second ranking metric (e.g., 506, with value "NaN") indicates that the second offer (e.g., offer 2) was not selected by the first user (e.g., user 3). As described herein, the second ranking metric may be updated with a new bi-directional recommendation value (e.g., 903 of FIG. 9) that indicates a likelihood of the first user (e.g., user 3) selecting the second offer (e.g., offer 2). The new bi-directional recommendation value may be determined via a request to the bi-directional look-up interface, where the bi-directional look-up interface may be used by the recommender server(s) 102 to lookup similarity pairing value(s) 602 and 606 of FIGS. 6A and 6C to determine (e.g., via the weighted sum determination) the new bi-directional recommendation value.

In some embodiments the recommender server(s) 102 may transmit, via a computer network, a recommendation structure (e.g., recommendation structure 700 or 800) to a second set of one or more processors, such executor servers 111 and 112. Each of the executor servers 111 and 112 may access the bi-directional look-up interface of the recommendation structure (e.g., recommendation structure 700 or 800) to determine a new bi-directional recommendation value from the similarity pairing values as described herein. In such embodiments, executor servers 111 and 112 may cause the second ranking metric (e.g., 506, NaN value) to be updated with the new bi-directional recommendation value (e.g., 903, the value "1") as described herein.

In some embodiments as described herein, a similarity pairing value (e.g., such as any of the content-based similarity pairing values 1102-1106 of FIGS. 11A-11C) may be generated based on one or more content attribute types (e.g., content attribute types 1002 of FIG. 10). In such embodiments, a first ratings vector may be a first attribute content vector (e.g., attribute content vector 1 1010 of FIG. 10) and a second ratings vector may be a second attribute content vector (e.g., attribute content vector 2 1012 of FIG. 10). The first attribute content vector (e.g., attribute content vector 1 1010) may include a first set of content attribute values (e.g., values {1,0,1,0} of attribute content vector 1 1010) corresponding to each content attribute type. Similarly, the second attribute content vector (e.g., attribute content vector 2 1012) may include a second set of content attribute values (e.g., values {0,1,0,1} of attribute content vector 2 1012) corresponding to each content attribute type. In such embodiments, at least one similarity pairing value (e.g., content-based similarity pairing value 1102, value "0") may be based on the similarity mapping between the first attribute content vector and the second attribute content vector.

In still further embodiments, a recommendation structure (e.g., recommendation structure 700) may be generated through transmission of the content ranking metrics to a first executor server and a second executor server, such as executor servers 111 and 112, respectively. In such embodiments, the recommender server(s) 102 may send, via a computer network (e.g., computer network 130), a first set of content ranking metrics (e.g., 1300*a* of FIG. 13) to the first executor server 111, where the first set of content ranking metrics are selected from the content ranking metrics associated with one or more users (e.g., content ranking metrics shown for FIG. 5). Similarly, recommender server(s) 102 may further be configured to send, via the computer network 130, a second set of content ranking metrics (e.g., 1300*b*) to the second executor server 112, where the second set of content ranking metrics selected from the content ranking metrics associated with one or more users. The recommender server(s) 102 may be configured to receive, from the first executor server 111 and as determined by the first executor server 111, a first set of partial similarity pairing values (e.g., 1402) based on the first set of content ranking metrics (e.g., content ranking metrics of 1300*a*). Each partial similarity pairing value (e.g., 1406-1410) of the first set may be based on a similarity mapping between two partial ratings vectors (e.g., partial ratings vectors 1-3 of 1300*a*) associated with the first set of content ranking metrics, as determined executor server 111. In addition, the recommender server(s) 102 may be further configured to receive, from the second executor server 112 and as determined by the second executor server 112, a second set of partial similarity pairing values (1416-1420) based on the second set of content ranking metrics (e.g., content ranking metrics of 1300*b*). Each partial similarity pairing value of the second set may be based on a similarity mapping between two partial ratings vectors (e.g., partial ratings vectors 1-3 of 1300*b*) associated with the second set of content ranking metrics, as determined by the second executor server 112. In such embodiments, the electronic recommendation structure (e.g., 1502) may be generated based on merging the first set of partial similarity pairing values and the second set of partial similarity pairing values. In some embodiments, electronic recommendation structure (e.g., 1502) may be graph-based or dictionary-based as described for item-to-item based recommendation structures 700 and 800, respectively. The electronic recommendation structure (e.g., 700, 800, and/or 1502) may also be stored in the recommender server(s) 102, executor server 111, and/or executor server 112 for later access, as described herein.

Figure 17:
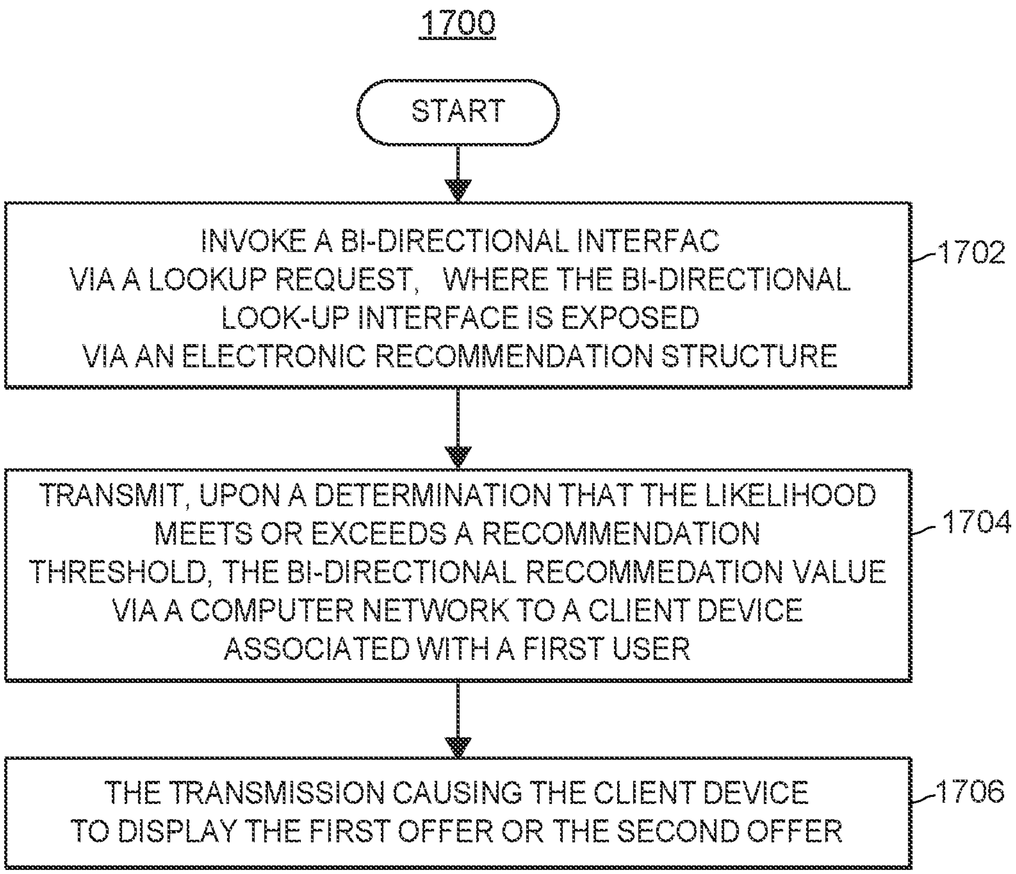
FIG. 17 illustrates a flow diagram of an exemplary method for providing user offers based on efficient iterative recommendation structures.

FIG. 17 illustrates a flow diagram of an exemplary method 1700 for providing user offers based on efficient iterative recommendation structures. At block 1702, a server (e.g., recommender server(s) 102) may invoke a bi-directional look-up interface via a lookup request. The bi-directional look-up interface may be a programmatic API type, or may be a RESTful API type, as described herein. The look up request may be made by the recommender server(s) 102 in accordance with the requirements of the specific API type (e.g., via a function call for the programmatic API or a RESTful network-based call for the RESTful API). The bi-directional look-up interface may be part of, and/or exposed, via an electronic recommendation structure (e.g., recommendation structures 700 or 800). For example, the recommendation structure may expose the bi-directional look-up interface via the programmatic and/or RESTful API such that the recommender server(s) 102 may access the bi-directional look-up interface. The lookup request may cause the bi-directional look-up interface to return a bi-directional recommendation value as determined from the similarity pairing values, as described herein. The bi-directional recommendation value may indicate a likelihood of a first user selecting a first offer (e.g., offer 1 of FIG. 5 from Papa Murphy's) or a second offer (e.g., offer 2 of FIG. 5 from LA Fitness). The bi-directional recommendation value determined from a similarity mapping between a first ratings vector (e.g., ratings vector 1 1010) associated with the first offer (e.g., offer 1 of FIG. 5) and a second ratings vector (e.g., ratings vector 2 1012) associated with the second offer (e.g., offer 2 of FIG. 5).

At block 1704, the bi-directional recommendation value may be transmitted via a computer network (e.g., computer network 130) to a client device (e.g., client device 120) associated with the first user and upon a determination that the likelihood meets or exceeds a recommendation threshold. For example, the recommendation threshold could be "1," where a bi-directional recommendation value would have to be "1" (e.g., values 901 or 903) in order for the recommender server(s) 102 to transmit such bi-directional recommendation values to the client device (e.g., 120). In contrast, a value of "0" (e.g., value 904) would, therefore, be below the threshold and would cause the recommender server(s) 102 to prevent transmission of such bi-directional recommendation value to the client device (e.g., client device 120).

At block 1706, the transmission may cause the client device to display at least one of the first offer (e.g., offer 1 of FIG. 5 from Papa Murphy's) or the second offer (e.g., offer 2 of FIG. 5 from LA Fitness). In some embodiments the client device (e.g., client device 120) may be operative to filter offers based on an offer type (e.g., filter by community or category as described for FIG. 4A). In other embodiments, the client device may be operative to identify offers based on a geographical location (filter by community offers as described for FIG. 4B). In additional embodiments a client device (e.g., client device 120) may be operative to display an amount of clipped offers associated with the first user (e.g., 4 clipped offers as shown in the embodiment of FIG. 2A). In other embodiments, the client device is operative to display a list of clipped offers associated with the first user (e.g., the list of clipped offers 216-220 as shown in the embodiment of FIG. 2B).

In some embodiments, the recommender server(s) 102 may receive, via the computer network 130, an indication that the first user selected the first offer (e.g., current offer 206), for example, such as when a user selects the thumbs-up icon 210 of FIG. 2A. In other embodiments, the indication that the first user selected the first offer (e.g., current offer 206) may cause the first offer (e.g., current offer 206) to be indicated as a clipped offer (e.g., clipped offer 216) on the client device 120. In other embodiments, the indication that the first user selected the first offer may cause the server to associate the first offer with the user, such as by storing or associating the first offer with the user's account. In still further embodiments, the indication that the first user selected the first offer may cause the server to update the recommendation structure. For example, in such embodiments, the new information received by the user's selection of the first offer (e.g., current offer 206) may cause the content ranking metrics of the item-to-item recommender 500 of FIG. 5 to be updated, which in turn may trigger the recommender server(s) 102 to generate an updated recommendation structure (e.g., recommendation structure 700 or 800) that may be used to determine new bi-directional recommendation values as described herein.

In additional embodiments a server, such as recommender server(s) 102, may update the recommendation structure automatically on a periodic basis, such as every second, hour, day, week, etc. (e.g., every 6 hours as shown for FIG. 3). The update may include regenerating a recommendation structure (e.g., a recommendation structure 700 or 800) to create an updated recommendation structure based on content ranking metrics available to the server at the time of the update. The available content ranking metrics may include new user selections (e.g., the selection using thumbs-up icon 210) captured since the last time the recommendation structure used by recommender server(s) 102 was generated.

In various aspects, an update to the recommendation structure may cause the recommender server(s) 102 to invoke an updated bi-directional look-up interface of the updated recommendation structure. The updated bi-directional look-up interface is the interface associated with the newly generated updated recommendation structure. The invocation of the updated bi-directional look-up interface may cause the server to transmit a new bi-directional recommendation value to the client device (e.g., client device 120). In still further embodiments, the client device (e.g., client device 120) may cause or trigger the invocation of the bi-directional look-up interface, where the client device, either automatically or at the request of the user, may transmit a client request to the recommender server(s) 120 that causes the invocation.

ADDITIONAL CONSIDERATIONS

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location, while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other embodiments, the one or more processors or processor-implemented modules may be distributed across a number of geographic locations.

This detailed description is to be construed as exemplary only and does not describe every possible embodiment, as describing every possible embodiment would be impractical, if not impossible. One may be implement numerous alternate embodiments, using either current technology or technology developed after the filing date of this application.

Those of ordinary skill in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A recommender system for generating efficient iterative reduced bi-directional data recommendation structures, the recommender system comprising:

a recommender server comprising one or more processors and one or more memories, wherein the recommender server further comprises computing instructions that when executed by the one or more processors cause the one or more processors to:

aggregate a plurality of ratings vectors, each ratings vector associated with a vector type, and each ratings vector containing one or more content ranking metrics, the content ranking metrics associated with one or more users;

generate at least two similarity pairing values from the plurality of ratings vectors, each similarity pairing value generated by similarity mapping between a first ratings vector and a second ratings vector;

generate a reduced bi-directional data recommendation structure having a reduced data structure comprising a single similarity pairing value instead of the at least two similarity pairing values and based on the similarity pairing values, the reduced bi-directional data recommendation structure comprising one or more data objects accessible by a bi-directional look-up interface; and return a bi-directional recommendation value determined from the generated reduced bi-directional data recommendation structure, after receiving a lookup request initiated by a client device via a computer network for either the vector type of the first ratings vector or the vector type of the second ratings vector.

2. The recommender system of claim 1, wherein the vector type is an offer-based vector type, and wherein the one or more content ranking metrics is associated with one or more offers.

3. The recommender system of claim 2, wherein a first ranking metric of the one or more content ranking metrics is associated with a first user and corresponds to a first offer associated with the first ratings vector, the first ranking metric indicating whether the first offer was selected by the first user.

4. The recommender system of claim 3, wherein a second ranking metric of the one or more content ranking metrics is associated with the first user and corresponds to a second offer associated with the second ratings vector, the second ranking metric not indicating whether the second offer was selected by the first user, and wherein the recommender system is further configured to update the second ranking metric with a new bi-directional recommendation value, the new bi-directional recommendation value indicating a likelihood of the first user selecting the second offer, and the new bi-directional recommendation value determined via a request to the bi-directional look-up interface.

5. The recommender system of claim 4 further configured to transmit, via a computer network, the reduced bi-directional data recommendation structure to a second set of one or more processors, the second set of one or more processors accessing the bi-directional look-up interface of the reduced bi-directional data recommendation structure to determine the new bi-directional recommendation value, the second set of one or more processors updating the second ranking metric with the new bi-directional recommendation value.

6. The recommender system of claim 2, wherein at least one similarity pairing value of the similarity pairing values is generated based on one or more content attribute types, wherein the first ratings vector is a first attribute content vector and the second ratings vector is a second attribute content vector, the first attribute content vector including a first set of content attribute values corresponding to each content attribute type, and the second attribute content vector including a second set of content attribute values corresponding to each content attribute type, wherein the at least one similarity pairing value is based on the similarity mapping between the first attribute content vector and the second attribute content vector.

7. The recommender system of claim 1, wherein the reduced bi-directional data recommendation structure is generated, via the one or more processors, and through transmission of the content ranking metrics to a first executor server and a second executor server, the one or more processors further configured to:

send, via a computer network, a first set of content ranking metrics to the first executor server, the first set of content ranking metrics selected from the content ranking metrics associated with the one or more users;

send, via the computer network, a second set of content ranking metrics to a second executor server, the second set of content ranking metrics selected from the content ranking metrics associated with the one or more users;

receive, from the first executor server, a first set of partial similarity pairing values based on the first set of content ranking metrics, each partial similarity pairing value of the first set based on a similarity mapping between two partial ratings vectors associated with the first set of content ranking metrics; and receive, from the second executor server, a second set of partial similarity pairing values based on the second set of content ranking metrics, each partial similarity pairing value of the second set based on a similarity mapping between two partial ratings vectors associated with the second set of content ranking metrics, wherein the reduced bi-directional data recommendation structure is generated based on merging the first set of partial similarity pairing values and the second set of partial similarity pairing values, and wherein the reduced bi-directional data recommendation structure is stored in the one or more memories of the first server.

8. The recommender system of claim 1, wherein the similarity pairing values are used to generate the bi-directional recommendation value.

9. The recommender system of claim 1, wherein the reduced bi-directional data recommendation structure is stored in the one or more memories, and wherein a bi-directional key value is associated with a similarity pairing value.

10. The recommender system of claim 1 further configured to generate, via the one or more processors, the reduced bi-directional data recommendation structure on a periodic basis.

11. A recommender method for generating efficient iterative reduced bi-directional data recommendation structures, the recommender method comprising:

aggregating, by one or more processors, a plurality of ratings vectors, each ratings vector associated with a vector type, and each ratings vector containing one or more content ranking metrics, the content ranking metrics associated with one or more users;

generating, by the one or more processors, at least two similarity pairing values from the plurality of ratings vectors, each similarity pairing value generated by similarity mapping between a first ratings vector and a second ratings vector;

generating, by the one or more processors, a reduced bi-directional data recommendation structure having a reduced data structure comprising a single similarity pairing value instead of the at least two similarity pairing values and based on the similarity pairing values, the reduced bi-directional data recommendation structure comprising one or more data objects accessible by a bi-directional look-up interface; and returning, by the one or more processors, a bi-directional recommendation value determined from the generated reduced bi-directional data recommendation structure, after receiving a lookup request initiated by a client device via a computer network for either the vector type of the first ratings vector or the vector type of the second ratings vector.

12. The recommender method of claim 11, wherein the vector type is an offer-based vector type, and wherein the one or more content ranking metrics is associated with one or more offers.

13. The recommender method of claim 12, wherein a first ranking metric of the one or more content ranking metrics is associated with a first user and corresponds to a first offer associated with the first ratings vector, the first ranking metric indicating whether the first offer was selected by the first user.

14. The recommender method of claim 13, wherein a second ranking metric of the one or more content ranking metrics is associated with the first user and corresponds to a second offer associated with the second ratings vector, the second ranking metric not indicating whether the second offer was selected by the first user, and wherein the recommender method further comprises updating the second ranking metric with a new bi-directional recommendation value, the new bi-directional recommendation value indicating a likelihood of the first user selecting the second offer, and the new bi-directional recommendation value determined via a request to the bi-directional look-up interface.

15. The recommender method of claim 14 further configured to transmit, via a computer network, the reduced bi-directional data recommendation structure to a second set of one or more processors, the second set of one or more processors accessing the bi-directional look-up interface of the reduced bi-directional data recommendation structure to determine the new bi-directional recommendation value, the second set of one or more processors updating the second ranking metric with the new bi-directional recommendation value.

16. The recommender method of claim 12, wherein at least one similarity pairing value of the similarity pairing values is generated based on one or more content attribute types, wherein the first ratings vector is a first attribute content vector and the second ratings vector is a second attribute content vector, the first attribute content vector including a first set of content attribute values corresponding to each content attribute type, and the second attribute content vector including a second set of content attribute values corresponding to each content attribute type, wherein the at least one similarity pairing value is based on the similarity mapping between the first attribute content vector and the second attribute content vector.

17. The recommender method of claim 11, wherein the reduced bi-directional data recommendation structure is generated, via the one or more processors, and through transmission of the content ranking metrics to a first executor server and a second executor server, the one or more processors further configured to:

send, via a computer network, a first set of content ranking metrics to the first executor server, the first set of content ranking metrics selected from the content ranking metrics associated with the one or more users;

send, via the computer network, a second set of content ranking metrics to a second executor server, the second set of content ranking metrics selected from the content ranking metrics associated with the one or more users;

receive, from the first executor server, a first set of partial similarity pairing values based on the first set of content ranking metrics, each partial similarity pairing value of the first set based on a similarity mapping between two partial ratings vectors associated with the first set of content ranking metrics; and receive, from the second executor server, a second set of partial similarity pairing values based on the second set of content ranking metrics, each partial similarity pairing value of the second set based on a similarity mapping between two partial ratings vectors associated with the second set of content ranking metrics, wherein the reduced bi-directional data recommendation structure is generated based on merging the first set of partial similarity pairing values and the second set of partial similarity pairing values, and wherein the reduced bi-directional data recommendation structure is stored in the one or more memories of the first server.

18. The recommender method of claim 11, wherein the similarity pairing values are used to generate the bi-directional recommendation value.

19. The recommender method of claim 11, wherein the reduced bi-directional data recommendation structure is stored in the one or more memories, and wherein a bi-directional key value is associated with a similarity pairing value.

20. A tangible, non-transitory computer-readable medium storing instructions for generating efficient iterative reduced bi-directional data recommendation structures, that when executed by one or more processors of a computing device, cause the computing device to:

aggregate a plurality of ratings vectors, each ratings vector associated with a vector type, and each ratings vector containing one or more content ranking metrics, the content ranking metrics associated with one or more users;

generate at least two similarity pairing values from the plurality of ratings vectors, each similarity pairing value generated by similarity mapping between a first ratings vector and a second ratings vector;

generate a reduced bi-directional data recommendation structure having a reduced data structure comprising a single similarity pairing value instead of the at least two similarity pairing values and based on the similarity pairing values, the reduced bi-directional data recommendation structure comprising one or more data objects accessible by a bi-directional look-up interface; and return a bi-directional recommendation value determined from the generated reduced bi-directional data recommendation structure, after receiving a lookup request initiated by a client device via a computer network for either the vector type of the first ratings vector or the vector type of the second ratings vector.

* * * * *